United States Patent
Sawada et al.

(10) Patent No.: US 10,717,227 B2
(45) Date of Patent: Jul. 21, 2020

(54) THREE-DIMENSIONAL-MODELING SOLUBLE MATERIAL

(71) Applicant: KAO CORPORATION, Tokyo (JP)

(72) Inventors: Hiroki Sawada, Wakayama (JP); Tadanori Yoshimura, Wakayama (JP); Jouji Hirai, Wakayama (JP); Takuma Kimura, Tokyo (JP)

(73) Assignee: KAO CORPORATION, Tokyo (JP)

( * ) Notice: Subject to any disclaimer, the term of this patent is extended or adjusted under 35 U.S.C. 154(b) by 365 days.

(21) Appl. No.: 15/549,056

(22) PCT Filed: Feb. 4, 2016

(86) PCT No.: PCT/JP2016/053368
§ 371 (c)(1),
(2) Date: Aug. 4, 2017

(87) PCT Pub. No.: WO2016/125860
PCT Pub. Date: Aug. 11, 2016

(65) Prior Publication Data
US 2018/0009160 A1    Jan. 11, 2018

(30) Foreign Application Priority Data

Feb. 6, 2015  (JP) ................................ 2015-022148
May 19, 2015  (JP) ................................ 2015-101743
Aug. 4, 2015  (JP) ................................ 2015-153935

(51) Int. Cl.
| | |
|---|---|
| *B29C 64/106* | (2017.01) |
| *B33Y 70/00* | (2020.01) |
| *B33Y 10/00* | (2015.01) |
| *B29C 67/00* | (2017.01) |
| *C08G 63/688* | (2006.01) |
| *B29C 64/40* | (2017.01) |
| *B32B 27/28* | (2006.01) |
| *B32B 33/00* | (2006.01) |

(52) U.S. Cl.
CPC .......... *B29C 64/106* (2017.08); *B29C 67/00* (2013.01); *B33Y 10/00* (2014.12); *B33Y 70/00* (2014.12); *C08G 63/688* (2013.01); *C08G 63/6886* (2013.01); *B29C 64/40* (2017.08); *B32B 27/286* (2013.01); *B32B 33/00* (2013.01); *B32B 2307/7166* (2013.01)

(58) Field of Classification Search
CPC .................................................... B29C 64/106
See application file for complete search history.

(56) References Cited

U.S. PATENT DOCUMENTS

| | | |
|---|---|---|
| 2005/0004282 A1 | 1/2005 | Priedeman, Jr. et al. |
| 2013/0192779 A1 | 8/2013 | Parker et al. |
| 2014/0088751 A1 | 3/2014 | Pridoehl et al. |
| 2014/0134334 A1 | 5/2014 | Pridoehl et al. |

FOREIGN PATENT DOCUMENTS

| | | |
|---|---|---|
| JP | 8-508528 A | 9/1996 |
| JP | 2002-516346 A | 6/2002 |
| JP | 2008-507619 A | 3/2008 |
| JP | 2014-516829 A | 7/2014 |
| JP | 2014-201660 A | 10/2014 |
| WO | WO 94/22932 A2 | 10/1994 |
| WO | WO 99/60507 A1 | 11/1999 |
| WO | WO 2006/020279 A2 | 2/2006 |
| WO | WO 2010/045147 A2 | 4/2010 |
| WO | WO 2010/045147 A3 | 4/2010 |

OTHER PUBLICATIONS

International Search Report issued in PCT/JP2016/053368 (PCT/ISA/210), dated Apr. 5, 2016.
International Preliminary Report on Patentability and English translation of the Written Opinion of the International Searching Authority issued in the corresponding International Application No. PCT/JP2016/053368 dated Aug. 17, 2017.
Extended European Search Report, dated Jul. 25, 2018, for European Application No. 16746691.1.
Japanese Office Action, dated Nov. 13, 2019, for Japanese Application No. 2016-019789.

*Primary Examiner* — Larry W Thrower
(74) *Attorney, Agent, or Firm* — Birch, Stewart, Kolasch & Birch, LLP

(57) ABSTRACT

A soluble material for three-dimensional modeling, which is used as a raw material of a support material for supporting a three-dimensional object when the three-dimensional object is produced, using a 3D printer of a FDM system, includes a polyester resin including one or more aromatic dicarboxylic acid monomer units A with a sulfonate group, one or more dicarboxylic acid monomer units B without a sulfonate group, and one or more diol monomer units. The proportion of the aromatic dicarboxylic acid monomer unit(s) A in the total of all dicarboxylic acid monomer units is from 10 to 70 mol %. The soluble material has hygroscopicity resistance while the material is large in dissolution rate into any neutral water and removable speedily from a precursor of the three-dimensional object without using any aqueous strong alkaline solution.

19 Claims, No Drawings

THREE-DIMENSIONAL-MODELING SOLUBLE MATERIAL

TECHNICAL FIELD

The present invention relates to a soluble material for three-dimensional modeling that is used as a material of a support material that supports a three-dimensional object when manufacturing the three-dimensional object with a 3D printer, especially a fused deposition modeling type 3D printer.

BACKGROUND ART

The 3D printer is one type of rapid prototyping, and it is a three-dimensional printer for modeling a three-dimensional object based on 3D data such as 3D CAD and 3D CG. Systems of 3D printing have been known, such as a fused deposition modeling system (hereinafter referred to as an FDM system), an inkjet ultraviolet curing system, a stereolithography system, and a selective laser sintering system. Among these systems, the FDM system is a modeling system of heat-melting, extruding, and laminating polymer filaments to obtain a three-dimensional object, and the FDM system does not use a reaction of the material unlike other systems. Accordingly, a 3D printer of an FDM system is small and inexpensive, and has become popular in recent years as an apparatus with less post-processing. In order to model a three-dimensional object having a more complex shape in a FDM system, a modeling material constituting the three-dimensional object and a support material for supporting a three-dimensional structure of the modeling material are laminated to obtain a precursor of the three-dimensional object, and then the support material is removed from the precursor of the three-dimensional object to obtain the target three-dimensional object.

An example of the method of removing the support material from the precursor of the three-dimensional object is a method of using a methacrylic acid copolymer as the support material and soaking the precursor of the three-dimensional object in an aqueous strong alkaline solution to remove the support material (for example, JP-T-2008-507619). The methodutilizes that carboxylic acid in the methacrylic acid copolymer is neutralized by an alkali and dissolved in an aqueous strong alkaline solution.

SUMMARY OF THE INVENTION

The soluble material of the present invention for three-dimensional modeling is a soluble material, for three-dimensional modeling, which is used as a raw material of a support material for supporting a three-dimensional object when the three-dimensional object is produced, using a 3D printer of a FDM system. This soluble material comprises a polyester resin comprising one or more aromatic dicarboxylic acid monomer units A with a sulfonate group, one or more dicarboxylic acid monomer units B without a sulfonate group, and one or more diol monomer units; and the proportion of the aromatic dicarboxylic acid monomer unit(s) A in the total of all dicarboxylic acid monomer units is from 10 to 70 mol %.

The three-dimensional object producing method of the present invention is a three-dimensional object producing method, according to a FDM system, comprising: the step of yielding a precursor of a three-dimensional object which comprises the three-dimensional object and further comprises a support material; and a support material removing step of bringing the precursor of the three-dimensional object into contact with a neutral water to remove the support material. The raw material of the support material is the soluble material for three-dimensional modeling.

The support material of the present invention is a support material for supporting a three-dimensional object when the three-dimensional object is produced using a 3D printer of a fused deposition modeling system. The support material comprises a polyester resin comprising one or more aromatic dicarboxylic acid monomer units A with a sulfonate group, one or more dicarboxylic acid monomer units B without a sulfonate group, and one or more diol monomer units. The proportion of the aromatic dicarboxylic acid monomer unit(s) A in the total of all dicarboxylic acid monomer units is from 10 to 70 mol %.

DETAILED DESCRIPTION OF THE INVENTION

In the case of using, as a support material, the methacrylic acid copolymer disclosed in the document JP-A-2008-507619, an aqueous strong alkaline solution needs to be used to remove the support material from a precursor of a three-dimensional object. However, this aqueous strong alkaline solution is large in danger for people and in load onto the environment. Moreover, when a precursor of the three-dimensional object is immersed in the aqueous strong alkaline solution for a longterm, the three-dimensional object in the precursor of the three-dimensional object tends to be eroded by the alkali. Thus, restrictions have been given to the use of any polyester resin, such as polylactic acid (PLA), which is low in resistance against alkalines, as a raw material of the three-dimensional object. Thus, support materials have been required which are removable not by any aqueous strong alkaline solution but by a neutral water having a pH of 6 to 8.

Against this problem, the document JP-A-2002-516346 discloses a method of using poly(2-ethyl-2-oxazoline), which is soluble in water, as a support material, and immersing a precursor of a three-dimensional object in water, so as to remove the support material therein. According to the method described in this document JP-A-2002-516346, the support material in the precursor of the three-dimensional object can be removed without using any aqueous strong alkaline solution. However, poly(2-ethyl-2-oxazoline), which is contained in the soluble material for three-dimensional modeling, is high in affinity with water. Thus, when the soluble material for three-dimensional modeling, which contains poly(2-ethyl-2-oxazoline), is exposed to a high humidity, this polymer absorbs water in the air. When the soluble material for three-dimensional modeling, which contains poly(2-ethyl-2-oxazoline) containing the water and further contains others, is heated, melted, printed out and laminated, using a 3D printer of an FDM system, the water is vaporized and scattered by high temperature so that the soluble material is foamed. Consequently, the precision of the resultant three-dimensional object is remarkably damaged.

The present invention provides a soluble material for three-dimensional modeling which is used for a support material, and which is suitable for the production of a three-dimensional object by use of an FDM system and has hygroscopicity resistance while the material is large in dissolution rate into any neutral water and removable speedily from a precursor of the three-dimensional object without using any aqueous strong alkaline solution.

The present invention provides a three-dimensional object producing method which makes it possible to restrain a support material from being foamed even when this method is used to produce a three-dimensional object, using a 3D printer after the support material is exposed to a high humidity, so that the three-dimensional object can be restrained from being lowered in precision, and which makes it possible to remove the support material, which is large in dissolution rate in any neutral water, speedily from a precursor of the three-dimensional object without using any aqueous strong alkaline solution.

The present invention provides a support material which can be restrained from being foamed even when this support material is used to produce a three-dimensional object, using a 3D printer after the support material is exposed to a high humidity, so that the three-dimensional object can be restrained from being lowered in precision, and which is large in dissolution rate in any neutral water to be removable speedily from a precursor of the three-dimensional object without using any aqueous strong alkaline solution.

The soluble material of the present invention for three-dimensional modeling is a soluble material, for three-dimensional modeling, which is used as a raw material of a support material for supporting a three-dimensional object when the three-dimensional object is produced, using a 3D printer of a FDM system. This soluble material comprises a polyester resin comprising one or more aromatic dicarboxylic acid monomer units A with a sulfonate group, one or more dicarboxylic acid monomer units B without a sulfonate group, and one or more diol monomer units; and the proportion of the aromatic dicarboxylic acid monomer unit(s) A in the total of all dicarboxylic acid monomer units is from 10 to 70 mol %.

The three-dimensional object producing method of the present invention is a three-dimensional object producing method, according to a FDM system, comprising: the step of yielding a precursor of a three-dimensional object which comprises the three-dimensional object and further comprises a support material; and a support material removing step of bringing the precursor of the three-dimensional object into contact with a neutral water to remove the support material. The raw material of the support material is the soluble material for three-dimensional modeling.

The support material of the present invention is a support material for supporting a three-dimensional object when the three-dimensional object is produced using a 3D printer of a fused deposition modeling system. The support material comprises a polyester resin comprising one or more aromatic dicarboxylic acid monomer units A with a sulfonate group, one or more dicarboxylic acid monomer units B without a sulfonate group, and one or more diol monomer units. The proportion of the aromatic dicarboxylic acid monomer unit(s) A in the total of all dicarboxylic acid monomer units is from 10 to 70 mol %.

The present invention can provide a soluble material for three-dimensional modeling which is used for a support material and which is suitable for the production of a three-dimensional object by use of an FDM system, and has hygroscopicity resistance while the material is large in dissolution rate into any neutral water and removable speedily from a precursor of the three-dimensional object without using any aqueous strong alkaline solution.

The present invention can provide a three-dimensional object producing method which makes it possible to restrain a support material from being foamed even when this method is used to produce a three-dimensional object, using a 3D printer after the support material is exposed to a high humidity, so that the three-dimensional object can be restrained from being lowered in precision, and which makes it possible to remove the support material, which is large in dissolution rate in any neutral water, speedily from a precursor of the three-dimensional object without using any aqueous strong alkaline solution.

The present invention can provide a support material which can be restrained from being foamed even when this support material is used to produce a three-dimensional object, using a 3D printer after the support material is exposed to a high humidity, so that the three-dimensional object can be restrained from being lowered in precision, and which is large in dissolution rate in any neutral water to be removable speedily from a precursor of the three-dimensional object without using any aqueous strong alkaline solution.

Hereinafter, an embodiment of the present invention will be described.

<Soluble Material for Three-Dimensional Modeling>

The soluble material of the present embodiment for three-dimensional modeling is a soluble material, for three-dimensional modeling, which is used as a raw material of a support material for supporting a three-dimensional object when the three-dimensional object is produced, using a 3D printer of an FDM system; and further this soluble material includes a polyester resin including aromatic dicarboxylic acid monomer units A with a sulfonate group, dicarboxylic acid monomer units B without a sulfonate group, and diol monomer units, and the proportion of the aromatic dicarboxylic acid monomer units A in the total of all dicarboxylic acid monomer units is from 10 to 70 mol %.

A support material made of a raw material that is the above-mentioned soluble material for three-dimensional modeling has hygroscopicity resistance, and is large in rate of dissolution into any neutral water. Thus, this support material is speedily removable from a precursor of a three-dimensional object without using any aqueous strong alkaline solution. The reason why this soluble material for three-dimensional modeling has such advantageous effects is unclear. However, the reason would be as follows:

The soluble material of the present embodiment for three-dimensional modeling has the polyester resin, which has, as its monomer units, the specified amount of an aromatic dicarboxylic acid with a sulfonate group. Since the polyester resin has the sulfonate group, the resin has a high solubility in any neutral water. Additionally, the polyester resin is low in hygroscopicity since the polyester resin has, as its monomer units, the aromatic dicarboxylic acid. The soluble material of the present embodiment for three-dimensional modeling has this polyester resin. It can be therefore considered that a support material including this soluble material for three-dimensional modeling has hygroscopicity resistance while the member is large in rate of dissolution in any neutral water and removable speedily from a precursor of a three-dimensional object without using any aqueous alkaline solution.

[Polyester Resin]

(Aromatic Dicarboxylic Acid Monomer Unit A)

The polyester resin has an aromatic dicarboxylic acid monomer unit with a sulfonate group. Herein, the aromatic dicarboxylic acid monomer unit with a sulfonate group is also called the aromatic dicarboxylic acid monomer unit A. Further, the aromatic dicarboxylic acid for deriving the aromatic dicarboxylic acid monomer unit A is also called an aromatic dicarboxylic acid A.

From the viewpoints of the solubility in any neutral water and the hygroscopicity resistance, the aromatic dicarboxylic acid A is preferably at least one aromatic dicarboxylic acid selected from the group consisting of 5-sulfoisophthalic acid, 2-sulfoterephthalic acid, and 4-sulfo-2,6-naphthalenedicarboxylic acid; more preferably at least one aromatic dicarboxylic acid selected from the group consisting of 5-sulfoisophthalic acid and 2-sulfoterephthalic acid; and further preferably 5-sulfoisophthalic acid.

From the viewpoint of the solubility in any neutral water, the rate of the aromatic dicarboxylic acid monomer unit A in the total amount of all dicarboxylic acid monomer units in the polyester resin is preferably 10 mol % or more, more preferably 15 mol % or more, further preferably 18 mol % or more, and even more preferably 20 mol % or more; and from the viewpoint of the hygroscopicity resistance, the rate is preferably 70 mol % or less, more preferably 60 mol % or less, further preferably 50 mol % or less, even more preferably 40 mol % or less, even more preferably 30 mol % or less, and even more preferably 25 mol % or less. Herein, the composition of the dicarboxylic acid monomer unit in the polyester resin is measured by the method described in the examples.

From the viewpoint of the solubility in any neutral water, the content of the aromatic dicarboxylic acid monomer unit A in the polyester resin is preferably 5 mol % or more, more preferably 7.5 mol % or more, further preferably 9 mol % or more, and even more preferably 10 mol % or more; and from the viewpoint of the hygroscopicity resistance, the content is preferably 35 mol % or less, more preferably 30 mol % or less, further preferably 25 mol % or less, even more preferably 20 mol % or less, even more preferably 15 mol % or less, and even more preferably 13 mol % or less.

Examples of a counter ion of the sulfonic acid group constituting the sulfonate group include at least one inorganic cation selected from the group consisting of a lithium ion, a sodium ion, a potassium ion, a magnesium ion, and an ammonium ion and at least one organic cation selected from the group consisting of a monoethanol ammonium ion, a diethanol ammonium ion, and a triethanol ammonium ion; however, from the viewpoint of the solubility in any neutral water, the counter ion is preferably at least one cation selected from the group consisting of a sodium ion, a potassium ion, a magnesium ion, and an ammonium ion, more preferably at least one cation selected from the group consisting of a sodium ion and a potassium ion, and further preferably a sodium ion.

From the viewpoint of the solubility in any neutral water, the content of the sulfonate group in the polyester resin is preferably 0.5 mmol/g or more, more preferably 0.6 mmol/g or more, further preferably 0.7 mmol/g or more, even more preferably 0.8 mmol/g or more, and even more preferably 0.9 mmol/g or more; and from the viewpoint of the hygroscopicity resistance, the content is preferably 3.0 mmol/g or less, more preferably 2.0 mmol/g or less, further preferably 1.5 mmol/g or less, even more preferably 1.3 mmol/g or less, and even more preferably 1.2 mmol/g or less. Herein, the content of the sulfonate group is measured by the method described in the examples.

(Dicarboxylic Acid Monomer Unit B)

The polyester resin has a dicarboxylic acid monomer unit without a sulfonate group. Herein, the dicarboxylic acid monomer unit without a sulfonate group is also called the dicarboxylic acid monomer unit B. Further, the dicarboxylic acid for deriving the dicarboxylic acid monomer unit B is also called a dicarboxylic acid B. The dicarboxylic acid B does not have a sulfonate group.

From the viewpoints of the solubility in any neutral water, the hygroscopicity resistance, and the heat resistance required for modeling by a 3D printer, the dicarboxylic acid B is preferably at least one dicarboxylic acid selected from the group consisting of an aromatic dicarboxylic acid and an alicyclic dicarboxylic acid. Among these dicarboxylic acids, from the same viewpoints, the dicarboxylic acid B is more preferably at least one dicarboxylic acid selected from the group consisting of terephthalic acid, isophthalic acid, 2,5-furandicarboxylic acid, 2,6-naphthalenedicarboxylic acid, 1,4-cyclohexanedicarboxylic acid, and 1,3-adamantanedicarboxylic acid; and further preferably at least one dicarboxylic acid selected from the group consisting of terephthalic acid, 2,5-furandicarboxylic acid, and 2,6-naphthalenedicarboxylic acid.

From the viewpoint of the hygroscopicity resistance, the rate of the dicarboxylic acid monomer unit B in the total amount of all dicarboxylic acid monomer units in the polyester resin is preferably 30 mol % or more, more preferably 40 mol % or more, further preferably 50 mol % or more, even more preferably 60 mol % or more, even more preferably 70 mol % or more, and even more preferably 75 mol % or more; and from the viewpoint of the solubility in any neutral water, the rate is preferably 90 mol % or less, more preferably 85 mol % or less, further preferably 82 mol % or less, and even more preferably 80 mol % or less.

From the viewpoint of the hygroscopicity resistance, the content of the dicarboxylic acid monomer unit B in the polyester resin is preferably 15 mol % or more, more preferably 20 mol % or more, further preferably 25 mol % or more, even more preferably 30 mol % or more, even more preferably 35 mol % or more, and even more preferably 38 mol % or more; and from the viewpoint of the solubility in any neutral water, the content is preferably 45 mol % or less, more preferably 43 mol % or less, further preferably 41 mol % or less, and even more preferably 40 mol % or less.

From the viewpoints of the solubility in any neutral water, the hygroscopicity resistance, and the heat resistance required for modeling by a 3D printer, the rate of the total amount of the aromatic dicarboxylic acid monomer unit A and the dicarboxylic acid monomer unit B in the total amount of all dicarboxylic acid monomer units in the polyester resin is preferably 80 mol % or more, more preferably 90 mol % or more, further preferably 95 mol % or more, even more preferably 98 mol % or more, even more preferably substantially 100 mol %, and even more preferably 100 mol %. Herein, "substantially 100 mol %" refers to a condition of inevitably containing a trace amount of impurities.

From the viewpoints of the solubility in any neutral water, the hygroscopicity resistance, and the heat resistance required for modeling by a 3D printer, the molar ratio of the aromatic dicarboxylic acid monomer unit A to the dicarboxylic acid monomer unit B (aromatic dicarboxylic acid monomer unit A/dicarboxylic acid monomer unit B) is preferably 10/90 or more, more preferably 15/85 or more, further preferably 18/82 or more, and even more preferably 20/80 or more; and from the same viewpoints, the molar ratio is preferably 50/50 or less, more preferably 40/60 or less, further preferably 30/70 or less, and even more preferably 25/75 or less.

(Diol Monomer Unit)

The polyester resin has a diol monomer unit. The diol for deriving the diol monomer unit is also called a diol C.

The diol C is not particularly limited, and an aliphatic diol, an aromatic diol, and the like can be used. However, an aliphatic diol is preferable from the viewpoint of manufacturing cost of the polyester resin.

From the viewpoints of the solubility in any neutral water, the hygroscopicity resistance, and the heat resistance required for modeling by a 3D printer, the number of carbon atoms of the diol C is preferably 2 or more; and from the same viewpoints, the number of carbon atoms is preferably 31 or less, more preferably 25 or less, further preferably 20 or less, and even more preferably 15 or less.

The aliphatic diol is at least one aliphatic diol selected from the group consisting of a chain diol and a cyclic diol; however, a chain diol is preferable from the viewpoints of the solubility in any neutral water, the hygroscopicity resistance, and the toughness (strength) required for modeling by a 3D printer.

From the viewpoints of the solubility in any neutral water, the hygroscopicity resistance, and the heat resistance required for modeling by a 3D printer, the number of carbon atoms of the chain diol is preferably 2 or more; and from the same viewpoints, the number of carbon atoms is preferably 6 or less, more preferably 4 or less, and further preferably 3 or less.

From the viewpoints of the solubility in any neutral water, the hygroscopicity resistance, and the heat resistance required for modeling by a 3D printer, the number of carbon atoms of the cyclic diol is preferably 6 or more; and from the same viewpoints, the number of carbon atoms is preferably 31 or less, more preferably 25 or less, further preferably 20 or less, even more preferably 15 or less, even more preferably 10 or less, and even more preferably 8 or less.

The diol C may have ether oxygen. From the viewpoints of the solubility in any neutral water, the hygroscopicity resistance, and the heat resistance required for modeling by a 3D printer, the number of ether oxygen atoms when the diol C is a chain aliphatic diol is preferably 1 or less; and from the same viewpoints, the number of ether oxygen atoms when the diol C is an alicyclic diol is preferably 2 or less.

From the viewpoints of the solubility in any neutral water, the hygroscopicity resistance, and the heat resistance required for modeling by a 3D printer, the chain diol is preferably at least one chain diol selected from the group consisting of ethylene glycol, 1,2-propanediol, 1,3-propanediol, diethylene glycol, and dipropylene glycol, and is more preferably at least one chain diol selected from the group consisting of ethylene glycol, 1,2-propanediol, and 1,3-propanediol. Out of these diols, diethylene glycol and dipropylene glycol may each be charged as a starting material for a polymerization reaction, or may be a glycol produced as a byproduct in the polymerization reaction.

When the diol C includes diethylene glycol, the proportion of units of diethylene glycol in the total of all diol monomer units in the polyester resin is preferably 5 mol % or more, more preferably 10 mol % or more, even more preferably 15 mol % or more, even more preferably 20 mol % or more, even more preferably 25 mol % or more, even more preferably 30 mol % or more, and is preferably 60 mol % or less, more preferably 55 mol % or less, even more preferably 50 mol % or less, even more preferably 45 mol % or less from the viewpoints of the solubility in any neutral water, the hygroscopicity resistance, and the heat resistance required for modeling by a 3D printer.

From the viewpoints of dissolvability in the aqueous cleaning agent, the moisture absorption resistance, and the heat resistance required for modeling by a 3D printer, the cyclic diol is preferably at least one cyclic diol selected from the group consisting of 1,4-cyclohexanedimethanol, hydrogenated bisphenol A, isosorbide, bisphenoxyethanolfluorene, bisphenolfluorene, biscresoxyethanolfluorene, and biscresolfluorene.

From the viewpoints of the solubility in any neutral water, the hygroscopicity resistance, and the heat resistance required for modeling by a 3D printer, the rate of the total amount of ethylene glycol, 1,2-propanediol, 1,3-propanediol, diethylene glycol, dipropylene glycol, 1,4-cyclohexanedimethanol, hydrogenated bisphenol A, isosorbide, bisphenoxyethanolfluorene, bisphenolfluorene, biscresoxyethanolfluorene, and biscresolfluorene in the total amount of all diol monomer units in the polyester resin when the diol C is at least one diol selected from the group consisting of ethylene glycol, 1,2-propanediol, 1,3-propanediol, diethylene glycol, dipropylene glycol, 1,4-cyclohexanedimethanol, hydrogenated bisphenol A, isosorbide, bisphenoxyethanolfluorene, bisphenolfluorene, biscresoxyethanolfluorene, and biscresolfluorene is preferably 80 mol % or more, more preferably 90 mol % or more, further preferably 95 mol % or more, and even more preferably 98 mol % or more, even more preferably substantially 100 mol %, and even more preferably 100 mol %. Herein, the composition of the diol monomer unit in the polyester resin is measured by the method described in the examples.

The polyester resin is preferably the following resin from the viewpoints of the solubility in any neutral water, the hygroscopicity resistance, and the heat resistance required for modeling by a 3D printer: a polyester resin α in which the proportion of the aromatic dicarboxylic acid monomer units A in the total of all dicarboxylic acid monomer units, which include the aromatic dicarboxylic acid units A, is from 15 to 40 mol %; the proportion of the dicarboxylic acid monomer units B in the same total is from 60 to 85 mol %; and the dicarboxylic acid B for yielding the dicarboxylic acid monomer units B is 2,5-furandicarboxylic acid.

(Polyester Resin α)

In the polyester resin α, the proportion of the aromatic dicarboxylic acid monomer units A in the total of all the dicarboxylic acid monomer units, which include the aromatic dicarboxylic acid monomer units A, is preferably 15 mol % or more, more preferably 20 mol % or more from the viewpoints of the solubility in any neutral water, the hygroscopicity resistance, and the heat resistance required for modeling by a 3D printer. From the same viewpoint, the proportion is preferably 40 mol % or less, more preferably 30 mol % or less, even more preferably 25 mol % or less.

In the polyester resin α, the proportion of the aromatic dicarboxylic acid monomer units B in the total of all the dicarboxylic acid monomer units, which include the aromatic dicarboxylic acid monomer units A, is preferably 60 mol % or more, more preferably 70 mol % or more, even more preferably 75 mol % or more from the viewpoints of the solubility in any neutral water, the hygroscopicity resistance, and the heat resistance required for modeling by a 3D printer. From the same viewpoint, the proportion is preferably 85 mol % or less, more preferably 80 mol % or less.

In the polyester resin α, the aromatic dicarboxylic acid A is preferably at least one selected from the group consisting of 5-sulfoisophthalic acid and 2-sulfoisophthalic acid, more preferably 5-sulfoisophthalic acid from the viewpoints of the solubility in any neutral water, the hygroscopicity resistance, and the heat resistance required for modeling by a 3D printer.

In the polyester resin α, the diol C is preferably at least one selected from the group consisting of ethylene glycol, diethylene glycol, 1,3-propane diol, and dipropylene glycol, more preferably at least one selected from the group consisting of ethylene glycol and diethylene glycol from the viewpoints of the solubility in any neutral water, the hygroscopicity resistance, and the heat resistance required for modeling by a 3D printer.

Example of the polyester resin α can be given by the following general formulae (1) and (2), respectively:

[Formula 1]

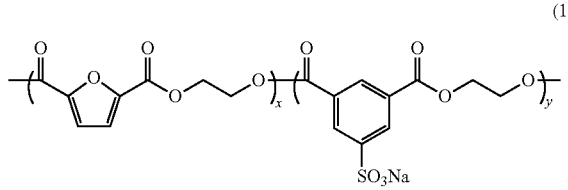

(1)

wherein X represents the number of the polymerization degree of ethylene furanoate, and Y represents that of the polymerization degree of ethylene 5-sulfoisophthalate provided that any unit of ethylene furanoate and any unit of ethylene 5-sulfoisophthalate are each in a block bond form and/or a random bond form, and are each more preferably in a random form from the viewpoint of the solubility in any neutral water.

[Formula 2]

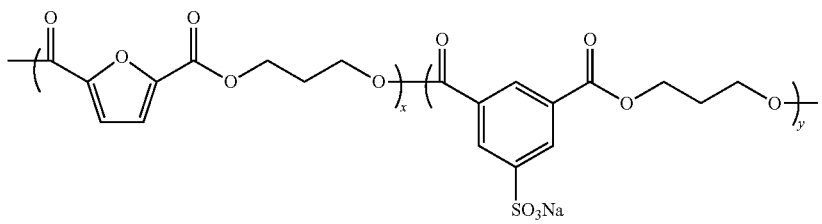

(2)

wherein X represents the number of the polymerization degree of 1,3-propylene furanoate, and Y represents that of the polymerization degree of 1,3-propylene 5-sulfoisophthalate provided that any unit of 1,3-propylene furanoate and any unit of 1,3-propylene 5-sulfoisophthalate are each in a block bond form and/or a random bond form, and are each more preferably in a random form from the viewpoint of the solubility in any neutral water.

From the viewpoint of improving toughness required for the soluble material for three-dimensional modeling, the weight average molecular weight of the polyester resin is preferably 3,000 or more, more preferably 8,000 or more, further preferably 10,000 or more, even more preferably 20,000 or more, even more preferably 30,000 or more, and even more preferably 40,000 or more; from the viewpoint of modeling properties by a 3D printer, the weight average molecular weight is preferably 80,000 or less, more preferably 70,000 or less, further preferably 60,000 or less, even more preferably 50,000 or less; and from the viewpoint of the solubility in any neutral water, the weight average molecular weight is preferably 60,000 or less, more preferably 50,000 or less, and further preferably 40,000 or less. Herein, the weight average molecular weight is measured by the method described in the examples.

From the viewpoint of modeling properties by a 3D printer, the glass transition temperature of the polyester resin is preferably 50° C. or higher, more preferably 60° C. or higher, further preferably 70° C. or higher, and even more preferably 80° C. or higher; and from the same viewpoint, the glass transition temperature is preferably 180° C. or lower, more preferably 160° C. or lower, further preferably 140° C. or lower, and even more preferably 120° C. or lower. Herein, the glass transition temperature is measured by the method described in the examples.

The polyester resin may have monomer units other than the aromatic dicarboxylic acid monomer unit A, the dicarboxylic acid monomer unit B, and the diol monomer unit as long as the effects of the present embodiment are not deteriorated.

The method for manufacturing the polyester resin is not particularly limited, and a conventionally known method for manufacturing a polyester resin can be adopted.

The content of the polyester resin in the soluble material for three-dimensional modeling can be adjusted in a range where the effects of the present embodiment are not deteriorated; however, from the viewpoints of the solubility in any neutral water, the hygroscopicity resistance, and the heat resistance required for modeling by a 3D printer, the content is preferably 30% by mass or more, more preferably 50% by mass or more, further preferably 60% by mass or more, even more preferably 70% by mass or more, even more preferably 80% by mass or more, even more preferably 90% by mass or more, even more preferably 95% by mass or more, even more preferably substantially 100% by mass, and even more preferably 100% by mass.

From the viewpoint of the modeling properties by a 3D printer, the glass transition temperature of the soluble material for three-dimensional modeling is preferably 50° C. or higher, more preferably 60° C. or higher, further preferably 70° C. or higher, and even more preferably 80° C. or higher; and from the same viewpoint, the glass transition temperature is preferably 180° C. or lower, more preferably 160° C. or lower, further preferably 140° C. or lower, and even more preferably 120° C. or lower.

The shape of the soluble material for three-dimensional modeling is not particularly limited; examples include a pellet shape, a powder shape, and a filament shape. However, the filament shape is preferable from the viewpoint of the modeling properties by the 3D printer.

The diameter of the filament is preferably 0.5 mm or more, and more preferably 1.0 mm or more from the viewpoints of the modeling properties by the 3D printer and improving the accuracy of the three-dimensional object. From the same viewpoint, the diameter is preferably 3.0 mm or less, more preferably 2.0 mm or less, even more preferably 1.8 mm or less. When the filament is produced, the filament is preferably drawn to be heightened in toughness. In the drawing, the draw ratio is preferably 1.5 or more, more preferably 2 or more, even more preferably 3 or more, even more preferably 5 or more from the viewpoint of compatibility between an improvement in the toughness and the water-solubility of the soluble material. From the same viewpoint, the draw ratio is preferably 200 or less, more preferably 150 or less, even more preferably 100 or less, even more preferably 50 or less. In the drawing, the drawing temperature ranges preferably from a temperature 20° C. lower than the glass transition temperature of the soluble material for three-dimensional modeling to a temperature 60° C. higher than the glass transition temperature. The lower limit of the drawing temperature is more preferably a temperature 10° C. lower than the glass transition temperature, even more preferably a temperature equal to the glass transition temperature from the viewpoint of an improvement in the toughness and the thermal stability of the soluble material. From the same viewpoint, the upper limit of the drawing temperature is more preferably a temperature 40° C. higher than the glass transition temperature, even more preferably a temperature 30° C. higher than the glass transition temperature, even more preferably a temperature 20° C. higher than the glass transition temperature. The means for heating at the time of the drawing is not particularly limited, and may be, for example, hot wind or a laser. About the drawing, an undrawn filament may be drawn into a predetermined predetermined draw ratio and filament diameter at a single stage, or may be drawn into a predetermined draw ratio and filament diameter at a multi-stage.

The soluble material for three-dimensional modeling may include a polymer other than any polyester resin in order to be heightened in physical properties as far as the advantageous effects of the present embodiment are not damaged. Examples of the polymer include water-soluble polymers such as polyvinyl alcohol, polyethylene glycol, poly(ethylene glycol/propylene glycol), carboxymethylcellulose, and starch; hydrophobic polymers such as polymethyl methacrylate; elastomers such as any polyetherester, polyetheresteramide and polyurethane that are each composed of hard segments and soft segments, block copolymers each made from an ionic monomer or water-soluble nonionic monomer, and a hydrophobic monomer, and other thermoplastic elastomers each made from styrene and butadiene, or an alkyl methacrylate (having 1 to 18 carbon atoms) and an alkyl acrylate (having 1 to 18 carbon atoms); graft polymers such as any graft polymer obtained by grafting a hydrophobic rubber with polyacrylic acid, N,N-dimethylacrylamide or some other polymer, and any graft polymer obtained by grafting a silicone with polyoxazoline or N,N-dimethylacrylamide; copolymers each obtained by copolymerizing ethylene or an alkyl acrylate (having 1 to 18 carbon atoms) with a monomer having a carboxyl group, such as acrylic acid or methacrylic acid, with a monomer having an epoxy group, such as glycidyl methacrylate, or with a monomer having an amide group, such as N,N-dimethylacrylamide; and impact buffering agents such as acrylic rubber, and natural rubber latex.

When the soluble material for three-dimensional modeling includes the polymer other than any polyester resin, the soluble material for three-dimensional modeling may include a compatibilizer to heighten the affinity and compatibility between this polymer and the polyester resin to improve performances of the soluble material for three-dimensional modeling or improve the toughness of the filament related to the soluble material for three-dimensional modeling. Examples of the compatibilizer include (i) copolymers each made from a monomer having a glycidyl group or isocyanato group and/or a monomer having an acid anhydride structure, such as maleic anhydride, and, e.g., an alkyl acrylate or methacrylate, ethylene, propylene or vinyl acetate; (ii) block copolymers each composed of two or more polymers selected from the following: polyester, polyamide, and polymers/copolymers each made from one or more selected from acrylic acid, methacrylic acid, any alkyl acrylate or methacrylate, acrylamide, N,N-dimethylacrylamide, ethylene, propylene, butadiene, isoprene, vinyl acetate, ethylene glycol, and propylene glycol; (iii) graft copolymers each composed of two or more polymers selected from the following: polyester, polyamide, and copolymers each composed of two or more polymers selected from the following: polyester, polyamide, and polymers/copolymers each made from one or more selected from acrylic acid, methacrylic acid, any alkyl acrylate or methacrylate, acrylamide, N,N-dimethylacrylamide, ethylene, propylene, butadiene, isoprene, vinyl acetate, ethylene glycol, and propylene glycol; and (iv) surfactants.

The soluble material for three-dimensional modeling may include a component different from the above-mentioned components as far as the advantageous effects of the present embodiment are not damaged. Examples of the different component include polyester resins other than the above-mentioned polyester, polymers other than any polyester resin, a plasticizer such as any polyalkylene glycol diester of benzoic acid, and fillers such as calcium carbonate, magnesium carbonate, glass spheres, graphite, carbon black, carbon fiber, glass fiber, talc, wollastonite, mica, alumina, silica, kaolin, whisker, and silicon carbide.

<Method for Manufacturing Three-Dimensional Object>

The method for manufacturing a three-dimensional object of the present embodiment is a method for manufacturing a three-dimensional object by fused deposition modeling, and includes a step of obtaining a precursor of a three-dimensional object containing the three-dimensional object and a support material, and a support material removing step of making the precursor of the three-dimensional object contact a neutral water to remove the support material. The material of the support material is the soluble material for three-dimensional modeling. The method for manufacturing a three-dimensional object can makes it possible to restrain a support material from being foamed even when this method is used to produce a three-dimensional object, using a 3D printer after the support material is exposed to a high humidity, so that the three-dimensional object can be restrained from being lowered in precision, and makes it possible to remove the support material, and is large in dissolution rate in any neutral water, speedily from a precursor of the three-dimensional object without using any aqueous strong alkaline solution. The reason why the method for manufacturing a three-dimensional object exhibits such an effect is not clear; however, the reason is presumably the same as the reason why the soluble material for three-dimensional modeling exhibits the effect.

[Step of Obtaining Precursor of Three-Dimensional Object Containing Three-Dimensional Object and Support Material]

As the step of obtaining a precursor of a three-dimensional object containing the three-dimensional object and the support material, a step of obtaining a precursor of a three-dimensional object containing the three-dimensional object and the support material of a known method for manufacturing a three-dimensional object with a fused deposition modeling type 3D printer can be used, except that the material of the support material is the soluble material for three-dimensional modeling.

For the modeling material that is a material of the three-dimensional object, any material can be used without particular limitation as long as the material is a resin that is used as a modeling material in the conventional method for manufacturing a three-dimensional object of an FDM system. Examples of the modeling material include thermoplastic resins such as an ABS resin, a polylactic resin, a polycarbonate resin, and a polyphenylsulfone resin, and among these, an ABS resin and/or a polylactic resin are more preferable, and an ABS resin is further preferable from the viewpoint of the modeling properties by the 3D printer.

[Support Material Removing Step of Making Precursor of Three-Dimensional Object Contact the Neutral Water to Remove Support Material]

The precursor of the three-dimensional object is made to contact a neutral water to remove the support material in the support material removing step. The method of making the precursor of the three-dimensional object contact the neutral water is preferably a method of soaking the precursor of the three-dimensional object in the neutral water from the viewpoints of cost and ease of work. From the viewpoint of improving removability of the support material, the precursor of the three-dimensional object is irradiated with ultrasonic waves while being soaked in the neutral water to promote dissolution of the support material.

[Neutral Water]

Examples of the neutral water include ion exchange water, pure water, tap water, and industrial water. From the viewpoint of economy, ion exchange water and tap water are preferred. The neutral water may contain a water-soluble organic solvent as far as the solvent does not damage the resultant modeled three-dimensional object. Examples of the water-soluble organic solvent include lower alcohols such as methanol, ethanol, and 2-propanol; glycol ethers such as propylene glycol monomethyl ether, ethylene glycol monoethyl ether, ethylene glycol mono-t-butyl ether, and diethylene glycol monobutyl ether; and ketones such as acetone, and methyl ethyl ketone. When the neutral water contains the water-soluble organic solvent, the content of the water-soluble organic solvent in the neutral water is preferably 0.1% or more by mass, more preferably 0.5% or more by mass, even more preferably 1% or more by mass, even more preferably 3% or more by mass, and is preferably 50% or less by mass, preferably 40% or less by mass, preferably 30% or less by mass, preferably 20% or less by mass.

The amount of the neutral water used is preferably 10 mass times or more, and more preferably 20 mass times or more the support material from the viewpoint of the solubility of the support material. The amount of the neutral water used is preferably 10,000 mass times or less, more preferably 5,000 mass times or less, further preferably 1,000 mass times or less, and further preferably 100 mass times or less the support material from the economic viewpoint.

The period over which the soluble material for three-dimensional modeling is caused to contact the neutral water is preferably 5 minutes or longer from the viewpoint of the removability of the support material, and is preferably 180 minutes or shorter, more preferably 120 minutes or shorter, even more preferably 90 minutes or shorter from the viewpoint of economy, and a decrease of damage which the three-dimensional object suffers through the contact of the object with the neutral water over a long period. The washing temperature, which depends on the species of the modeling material, is preferably 15° C. or higher, more preferably 25° C. or higher, even more preferably 30° C. or higher, even more preferably 40° C. or higher from the viewpoint of economy, the removability of the support material, and a decrease of damage which the three-dimensional object suffers. From the same viewpoint, the temperature is preferably 85° C. or lower, more preferably 70° C. or lower, even more preferably 60° C. or lower.

<Support Material>

The support material of the present embodiment is a support material for supporting a three-dimensional object when the three-dimensional object is produced using a 3D printer of a fused deposition modeling system. The support material comprises the polyester resin. The support material can be restrained from being foamed even when this support material is used to produce a three-dimensional object, using a 3D printer after the support material is exposed to a high humidity, so that the three-dimensional object can be restrained from being lowered in precision. The support material is large in dissolution rate in any neutral water to be removable speedily from a precursor of the three-dimensional object without using any aqueous strong alkaline solution. The reason why the support material exhibits such an effect is not clear; however, the reason is presumably the same as the reason why the soluble material for three-dimensional modeling exhibits the effect.

With respect to the above-described embodiment, the present description further discloses the following composition and manufacturing method.

<1> A soluble material for three-dimensional modeling, which is used as a raw material of a support material for supporting a three-dimensional object when the three-dimensional object is produced, using a 3D printer of a fused deposition modeling system;

the soluble material comprising a polyester resin comprising one or more aromatic dicarboxylic acid monomer units A with a sulfonate group, one or more dicarboxylic acid monomer units B without a sulfonate group, and one or more diol monomer units; and the proportion of the aromatic dicarboxylic acid monomer unit (s) A in the total of all dicarboxylic acid monomer units being from 10 to 70 mol %.

<2> The soluble material for three-dimensional modeling according to <1>, wherein an aromatic dicarboxylic acid A for deriving the aromatic dicarboxylic acid monomer unit A is preferably at least one aromatic dicarboxylic acid selected from the group consisting of 5-sulfoisophthalic acid, 2-sulfoterephthalic acid, and 4-sulfo-2,6-naphthalenedicarboxylic acid; more preferably at least one aromatic dicarboxylic acid selected from the group consisting of 5-sulfoisophthalic acid and 2-sulfoterephthalic acid; and further preferably 5-sulfoisophthalic acid.

<3> The soluble material for three-dimensional modeling according to <1> or <2>, wherein the rate of the dicarboxylic acid monomer unit A in the total amount of all dicarboxylic acid monomer units in the polyester resin is preferably 10 mol % or more, more preferably 15 mol % or more, further preferably 18 mol % or more, and even more preferably 20 mol % or more; and is preferably 70 mol % or less, more preferably 60 mol % or less, further preferably 50 mol % or less, even more preferably 40 mol % or less, even more preferably 30 mol % or less, and even more preferably 25 mol % or less.

<4> The soluble material for three-dimensional modeling according to any one of <1> to <3>, wherein the content of the aromatic dicarboxylic acid monomer unit A in the polyester resin is preferably 5 mol % or more, more preferably 7.5 mol % or more, further preferably 9 mol % or more, and even more preferably 10 mol % or more; and is preferably 35 mol % or less, more preferably 30 mol % or less, further preferably 25 mol % or less, even more preferably 20 mol % or less, even more preferably 15 mol % and even more preferably 13 mol %.

<5> The soluble material for three-dimensional modeling according to any one of <1> to <4>, wherein a counter ion of the sulfonic acid group constituting the sulfonate group is preferably at least one inorganic cation selected from the group consisting of a lithium ion, a sodium ion, a potassium ion, a magnesium ion, and an ammonium ion and at least one organic cation selected from the group consisting of a monoethanol ammonium ion, a diethanol ammonium ion, and a triethanol ammonium ion; more preferably at least one cation selected from the group consisting of a sodium ion, a potassium ion, a magnesium ion, and an ammonium ion; further preferably at least one cation selected from the group consisting of a sodium ion and a potassium ion; and even more preferably a sodium ion.

<6> The soluble material for three-dimensional modeling according to any one of <1> to <5>, wherein the content of the sulfonate in the polyester resin is preferably 0.5 mmol/g or more, more preferably 0.6 mmol/g or more, further preferably 0.7 mmol/g or more, even more preferably 0.8 mmol/g or more, and even more preferably 0.9 mmol/g or more; and is preferably 3.0 mmol/g or less, more preferably 2.0 mmol/g or less, further preferably 1.5 mmol/g or less, even more preferably 1.3 mmol/g or less, and even more preferably 1.2 mmol/g or less.

<7> The soluble material for three-dimensional modeling according to any one of <1> to <6>, wherein a dicarboxylic acid B for deriving the dicarboxylic acid monomer unit B is preferably at least one dicarboxylic acid selected from the group consisting of an aromatic dicarboxylic acid and an alicyclic dicarboxylic acid; more preferably at least one dicarboxylic acid selected from the group consisting of terephthalic acid, isophthalic acid, 2,5-furandicarboxylic acid, 2,6-naphthalenedicarboxylic acid, 1,4-cyclohexanedicarboxylic acid, and 1,3-adamantanedicarboxylic acid; and further preferably at least one dicarboxylic acid selected from the group consisting of terephthalic acid, 2,5-furandicarboxylic acid, and 2,6-naphthalenedicarboxylic acid.

<8> The soluble material for three-dimensional modeling according to any one of <1> to <7>, wherein the rate of the dicarboxylic acid monomer unit B in the total amount of all dicarboxylic acid monomer units in the polyester resin is preferably 30 mol % or more, more preferably 40 mol % or more, further preferably 50 mol % or more, even more preferably 60 mol % or more, even more preferably 70 mol % or more, and even more preferably 75 mol % or more; and is preferably 90 mol % or less, more preferably 85 mol % or less, further preferably 82 mol % or less, and even more preferably 80 mol % or less.

<9> The soluble material for three-dimensional modeling according to any one of <1> to <8>, wherein the content of the dicarboxylic acid monomer unit B in the polyester resin is preferably 15 mol % or more, more preferably 20 mol % or more, further preferably 25 mol % or more, even more preferably 30 mol % or more, even more preferably 35 mol % or more, and even more preferably 38 mol % or more; and is preferably 45 mol % or less, more preferably 43 mol % or less, further preferably 41 mol % or less, and even more preferably 40 mol % or less.

<10> The soluble material for three-dimensional modeling according to any one of <1> to <9>, wherein the rate of the total amount of the aromatic dicarboxylic acid monomer unit A and the dicarboxylic acid monomer unit B in the total amount of all dicarboxylic acid monomer units in the polyester resin is preferably 80 mol % or more, more preferably 90 mol % or more, further preferably 95 mol % or more, even more preferably 98 mol % or more, even more preferably substantially 100 mol %, and even more preferably 100 mol %.

<11> The soluble material for three-dimensional modeling according to any one of <1> to <10>, wherein the molar ratio of the aromatic dicarboxylic acid monomer unit A to the dicarboxylic acid monomer unit B (aromatic dicarboxylic acid monomer unit A/dicarboxylic acid monomer unit B) is preferably 10/90 or more, more preferably 15/85 or more, further preferably 18/82 or more, and even more preferably 20/80 or more; and is preferably 50/50 or less, more preferably 40/60 or less, further preferably 30/70 or less, and even more preferably 25/75 or less.

<12> The soluble material for three-dimensional modeling according to any one of <1> to <11>, wherein a diol C for deriving the diol monomer unit is preferably at least one diol selected from the group consisting of an aliphatic diol and an aromatic diol, and more preferably at least one diol selected from the group consisting of an aliphatic diol.

<13> The soluble material for three-dimensional modeling according to any one of <1> to <12>, wherein the number of carbon atoms of the diol C is preferably 2 or more; and is preferably 31 or less, more preferably 25 or less, further preferably 20 or less, and even more preferably 15 or less.

<14> The soluble material for three-dimensional modeling according to any one of <1> to <13>, wherein the aliphatic diol is preferably at least one aliphatic diol selected from the group consisting of a chain diol and a cyclic diol, and more preferably a chain dial.

<15> The soluble material for three-dimensional modeling according to <14>, wherein the number of carbon atoms of the chain diol is preferably 2 or more; and is preferably 6 or less, more preferably 4 or less, and further preferably 3 or less.

<16> The soluble material for three-dimensional modeling according to <14> or <15>, wherein the number of carbon atoms of the cyclic diol is preferably 6 or more; and is preferably 31 or less, more preferably 25 or less, further preferably 20 or less, even more preferably 15 or less, even more preferably 10 or less, and even more preferably 8 or less.

<17> The soluble material for three-dimensional modeling according to any one of <14> to <16>, wherein the chain diol is preferably at least one chain diol selected from the group consisting of ethylene glycol, 1,2-propanediol, 1,3-propanediol, diethylene glycol, and dipropylene glycol, and is more preferably at least one chain diol selected from the group consisting of ethylene glycol, 1,2-propanediol, and 1,3-propanediol.

<18> The soluble material for three-dimensional modeling according to any one of <1> to <17>, wherein the diol C includes diethylene glycol, wherein the proportion of units of diethylene glycol in the total of all diol monomer units in the polyester resin is preferably 5 mol % or more, more preferably 10 mol % or more, even more preferably 15 mol % or more, even more preferably 20 mol % or more, even more preferably 25 mol % or more, even more preferably 30 mol % or more, and is preferably 60 mol % or less, more preferably 55 mol % or less, even more preferably 50 mol % or less, even more preferably 45 mol % or less.

<19> The soluble material for three-dimensional modeling according to any one of <14> to <18>, wherein the cyclic diol is preferably at least one cyclic diol selected from the group consisting of 1,4-cyclohexanedimethanol, hydrogenated bisphenol A, isosorbide, bisphenoxyethanolfluorene, bisphenolfluorene, biscresoxyethanolfluorene, and biscresolfluorene.

<20> The soluble material for three-dimensional modeling according to any one of <1> to <19>, wherein the polyester resin is preferably a polyester resin α in which the proportion of the aromatic dicarboxylic acid monomer units A in the total of all dicarboxylic acid monomer units, which include the aromatic dicarboxylic acid units A, is from 15 to 40 mol %; the proportion of the dicarboxylic acid monomer units B in the same total is from 60 to 85 mol %; and the dicarboxylic acid B for yielding the dicarboxylic acid monomer units B is 2,5-furandicarboxylic acid.

<21> The soluble material for three-dimensional modeling according to any one of <1> to <20>, wherein the proportion of the aromatic dicarboxylic acid monomer units A in the total of all the dicarboxylic acid monomer units in the polyester resin α, which include the aromatic dicarboxylic acid monomer units A, is preferably 15 mol %, more preferably 20 mol % or more; and is preferably 40 mol % or less, more preferably 30 mol % or less, even more preferably 25 mol % or less.

<22> The soluble material for three-dimensional modeling according to any one of <1> to <21>, wherein the proportion of the aromatic dicarboxylic acid monomer units B in the total of all the dicarboxylic acid monomer units in the polyester resin α, which include the aromatic dicarboxylic acid monomer units A, is preferably 60 mol % or more, more preferably 70 mol % or more, even more preferably 75 mol % or more; and is preferably 85 mol % or less, more preferably 80 mol % or less.

<23> The soluble material for three-dimensional modeling according to any one of <1> to <22>, wherein the aromatic dicarboxylic acid A in the polyester resin α is preferably at least one selected from the group consisting of 5-sulfoisophthalic acid and 2-sulfoisophthalic acid, more preferably 5-sulfoisophthalic acid.

<24> The soluble material for three-dimensional modeling according to any one of <1> to <23>, wherein the diol C in the polyester resin α is preferably at least one selected from the group consisting of ethylene glycol, diethylene glycol, 1,3-propane diol, and dipropylene glycol, more preferably at least one selected from the group consisting of ethylene glycol and diethylene glycol.

<25> The soluble material for three-dimensional modeling according to any one of <1> to <24>, wherein the weight average molecular weight of the polyester resin is preferably 3,000 or more, more preferably 8,000 or more, further preferably 10,000 or more, even more preferably 20,000 or more, even more preferably 30,000 or more, and even more preferably 40,000 or more; and is preferably 80,000 or less, more preferably 70,000 or less, further preferably 60,000 or less, even more preferably 50,000 or less; and is preferably 60,000 or less, more preferably 50,000 or less, and further preferably 40,000 or less.

<26> The soluble material for three-dimensional modeling according to any one of <1> to <25>, wherein the glass transition temperature of the polyester resin is preferably 50° C. or higher, more preferably 60° C. or higher, further preferably 70° C. or higher, and even more preferably 80° C. or higher; and is preferably 180° C. or lower, more preferably 160° C. or lower, further preferably 140° C. or lower, and even more preferably 120° C. or lower.

<27> The soluble material for three-dimensional modeling according to any one of <1> to <26>, wherein the content of the polyester resin in the soluble material for three-dimensional modeling is preferably 30% by mass or more, more preferably 50% by mass or more, further preferably 60% by mass or more, even more preferably 70% by mass or more, even more preferably 80% by mass or more, even more preferably 90% by mass or more, even more preferably 95% by mass or more, even more preferably substantially 100% by mass, and even more preferably 100% by mass.

<28> The soluble material for three-dimensional modeling according to any one of <1> to <27>, wherein the glass transition temperature of the soluble material for three-dimensional modeling is preferably 50° C. or higher, more preferably 60° C. or higher, further preferably 70° C. or higher, and even more preferably 80° C. or higher; and from the same viewpoint, the glass transition temperature is preferably 180° C. or lower, more preferably 160° C. or lower, further preferably 140° C. or lower, and even more preferably 120° C. or lower.

<29> The soluble material for three-dimensional modeling according to any one of <1> to <28>, wherein the shape of the soluble material for three-dimensional modeling is preferably a pellet shape, a powder shape, and a filament shape; is more preferably a filament shape.

<30> The soluble material for three-dimensional modeling according to <29>, wherein the diameter of the filament is preferably 0.5 mm or more, and more preferably 1.0 mm or more; and is preferably 3.0 mm or less, more preferably 2.0 mm or less, even more preferably 1.8 mm or less.

<31> The soluble material for three-dimensional modeling according to <29> or <30>, wherein the filament is preferably drawn.

<32> The soluble material for three-dimensional modeling according to <31>, wherein the draw ratio in the drawing is preferably 1.5 or more, more preferably 2 or more, even more preferably 3 or more, even more preferably 5 or more; and is preferably 200 or less, more preferably 150 or less, even more preferably 100 or less, even more preferably 50 or less.

<33> The soluble material for three-dimensional modeling according to <31> or <32>, wherein the drawing temperature ranges in the drawing preferably from a temperature 20° C. lower than the glass transition temperature of the soluble material for three-dimensional modeling to a temperature 60° C. higher than the glass transition temperature.

<34> The soluble material for three-dimensional modeling according to any one of <31> to <33>, wherein the lower limit of the drawing temperature in the drawing is more preferably a temperature 10° C. lower than the glass transition temperature, even more preferably a temperature equal to the glass transition temperature; and the upper limit of the drawing temperature in the drawing is more preferably a temperature 40° C. higher than the glass transition temperature, even more preferably a temperature 30° C. higher than the glass transition temperature, even more preferably a temperature 20° C. higher than the glass transition temperature.

<35> The soluble material for three-dimensional modeling according to anyone of <1> to <34>, wherein the soluble material for three-dimensional modeling includes a compatibilizer.

<36> A method for manufacturing a three-dimensional object by fused deposition modeling, including a step of obtaining a precursor of a three-dimensional object containing the three-dimensional object and a support material, and a support material removing step of making the precursor of the three-dimensional object contact a neutral water to remove the support material, wherein the material of the support material is the soluble material for three-dimensional modeling according to any one of <1> to <37>.

<37> The method for manufacturing a three-dimensional object according to <36>, wherein a modeling material as a material for the three-dimensional object is preferably at least one member selected from the group consisting of an ABS resin, a polylactic resin, a polycarbonate resin, and a polyphenylsulfone resin, more preferably an ABS resin and/or a polylactic resin, and further preferably an ABS resin.

<38> The method for manufacturing a three-dimensional object according to <36> or <37>, comprising the support material removing step that is a support material removing step of immersing the precursor of the three-dimensional object in the neutral water to dissolve the support material.

<39> The method for manufacturing a three-dimensional object according to anyone of <36> to <38>, wherein the neutral water contains a water-soluble organic solvent.

<40> The method for manufacturing a three-dimensional object according to any one of <36> to <39>, wherein the water-soluble organic solvent is at least one selected from the group consisting of lower alcohols such as methanol, ethanol, and 2-propanol; glycol ethers such as propylene glycol monomethyl ether, ethylene glycol monoethyl ether, ethylene glycol mono-t-butyl ether, and diethylene glycol monobutyl ether; and ketones such as acetone, and methyl ethyl ketone.

<41> The method for manufacturing a three-dimensional object according to <39> to <40>, the content of the water-soluble organic solvent in the neutral water is preferably 0.1% or more by mass, more preferably 0.5% or more by mass, even more preferably 1% or more by mass, even more preferably 3% or more by mass; and is preferably 50% or less by mass, preferably 40% or less by mass, preferably 30% or less by mass, preferably 20% or less by mass.

<42> A support material for supporting a three-dimensional object when the three-dimensional object is produced using a 3D printer of a fused deposition modeling system; the support material comprising a polyester resin comprising one or more aromatic dicarboxylic acid monomer units A with a sulfonate group, one or more dicarboxylic acid monomer units B without a sulfonate group, and one or more diol monomer units; and the proportion of the aromatic dicarboxylic acid monomer unit (s) A in the total of all dicarboxylic acid monomer units being from 10 to 70 mol %.

<43> The support material according to <42>, wherein the polyester resin is a polyester resin which is used for the soluble material for three-dimensional modeling according to any one of <1> to <35>

<44> Use of the soluble material for three-dimensional modeling according to any one of <1> to <35> as a material of the support material.

<Analyzing Methods>
[Dicarboxylic Acid Composition, and Diol Composition in Polyester Resin]

By a proton NMR measurement using an NMR, MR400, manufactured by Agilent Technologies, Inc., the composition of dicarboxylic acid monomer units, and that of diol monomer units in a polyester resin are gained. When it is difficult to gain the composition of the dicarboxylic acid monomer units, and that of the diol monomer units by the NMR measurement, for example, for the reason that their peaks overlap with each other, these compositions can be gained by hydrolyzing the polyester with an alkali, and then subjecting the resultant to gas chromatographic analysis.

[Amount of Sulfonate Group in Polyester Resin]

The amount (mmol/g) of the sulfonate group in the polyester was calculated from the composition of the isophthalate group monomer unit obtained above according to the following formula. The number of moles of the whole dicarboxylic acid monomer units and the number of moles of the whole diol monomer units were assumed to be equal.

Amount of sulfonate group (mmol/g)=$A \times 1000/(A \times (M_s+M_o)+(100-A)\times(M_c+M_o)-2\times18.0\times100)$ A: Rate (mol %) of isophthalate group monomer unit in the whole dicarboxylic acid monomer units
$M_s$: Molecular weight of sulfoisophthalate (free dicarboxylic acid type)
$M_o$: Molecular weight of diol (number average molecular weight if there are multiple types of diols)
$M_c$: Molecular weight of dicarboxylic acids other than isophthalate group (number average molecular weight if there are multiple types of dicarboxylic acids)

[Molecular Weight and Molecular Weight Distribution of Polyester Resin]

Using gel permeation chromatography (GPC) under the following conditions, a calibration curve was produced from standard polystyrene to obtain a weight average molecular weight (Mw).

(Measurement Conditions)
Machine: HLC-8320 GPC (Tosoh Corporation, detector integrated type)
Column: α-M×2 (manufactured by Tosoh Corporation, 7.8 mm I.D.×30 cm)
Eluent: 60 mmol/L Phosphoric acid+50 mmol/Lithium bromide/dimethylformamide solution
Flow rate: 1.0 mL/min
Column temperature: 40° C.
Detector: RI detector
Standard: Polystyrene

[Glass Transition Temperature of Polyester Resin]

Using a pressing machine (Labo Press P2-30T manufactured by Toyo Seiki Seisaku-sho, Ltd.), a sample was pressed at a temperature of 200° C. and a pressure of 20 MPa for 2 minutes and rapidly cooled to form a sheet having a thickness of 0.4 mm. From the sheet, 5 to 10 mg of a sample was cut out with scissors, precisely weighed, and sealed in an aluminum pan. Using a DSC machine (DSC7020 manufactured by Seiko Instruments Inc.), the temperature of the aluminum pan was increased from 30° C. to 250° C. at 10° C./min, rapidly cooled to 30° C., and was increased again to 250° C. at 10° C./min to obtain a DSC curve. The glass transition temperature (° C.) was obtained from the DSC curve.

<Synthesis of Polyester Resins>

Synthesis Example 1

Into a 2-L separable flask made of stainless steel (and equipped with a dewatering conduit, a stirrer and a nitrogen-introducing tube) were charged 239 g of 2,5-furandicarboxylic acid (manufactured by a company V & V Pharma Industries), 209 g of ethylene glycol (manufactured by Wako Pure Chemical Industries, Ltd.; special grade), 0.224 g of tin octylate (manufactured by Nitto Kasei Co., Ltd.), and 0.022 g of gallic acid (manufactured by Wako Pure Chemical Industries, Ltd.). In a nitrogen atmosphere of a normal pressure, a mantle heater was used to heat the flask at 200° C. for 20 hours to esterify the dicarboxylic acid. The reaction system was cooled to room temperature, and then thereto were added 118 g of sodium dimethyl 5-sulfoisophthalate (manufactured by Wako Pure Chemical Industries, Ltd.), 54 g of ethylene glycol, 0.058 g of titanium tetraisopropoxide (manufactured by Wako Pure Chemical Industries, Ltd.; first grade), and 0.006 g of gallic acid. The system was raised in temperature, and stirred at 185° C. under a normal pressure for 4 hours to subject the components concerned to transesterification. The temperature of the system was raised to 215° C., and subsequently the pressure in the system was reduced from 12 kPa to 400 Pa over 4 hours. Furthermore, the system was stirred at 240° C. and 660 Pa for 7 hours to polycondense the polycondensable components. In this way, a polyester compound 1 was yielded which was a blackish brown solid (at room temperature).

Synthesis Example 2

In a 1-L separable flask made of stainless steel (and equipped with a K-shaped tube, a stirrer, and a nitrogen-introducing tube) were charged 125 g of 2,5-furandicarboxylic acid and 149 g of ethylene glycol. In a nitrogen atmosphere of a normal pressure, the reaction system was heated at a bath temperature of 205° C. for 5 hours to esterify the dicarboxylic acid. The system was cooled to 140° C., and then thereto was added 116 g of sodium dimethyl 5-sulfoisophthalate. The system was stirred at 140° C. for 0.5 hour. The system was cooled to 100° C., and then thereto was added 0.364 g of titanium tetraisopropoxide. The system was raised in temperature, and then heated under a condition of 210° C. at a normal pressure for 1 hour, conditions from 140° C. at 3 kPa to 210° C. at 2 kPa for 1.5 hours, and conditions from 210° C. at 1360 Pa to 250° C. at 90 Pa for 1 hour to polycondense the polycondensable components. In this way, a polyester compound 2 was yielded which was a yellow solid (at room temperature).

Synthesis Example 3

In a 1-L separable flask made of stainless steel (and equipped with a K-shaped tube, a stirrer, and a nitrogen-introducing tube) were charged 125 g of 2,5-furandicarboxylic acid and 149 g of ethylene glycol. In a nitrogen atmosphere of a normal pressure, the reaction system was heated at a bath temperature of 205° C. for 5 hours to esterify the dicarboxylic acid. The system was cooled to 100° C., and then thereto was added 61.6 g of sodium dimethyl 5-sulfoisophthalate. The system was stirred at 160° C. for 0.5 hour. The system was cooled to 50° C., and then thereto was added 0.364 g of titanium tetraisopropoxide. The system was raised in temperature, and then heated under a condition of 205° C. at a normal pressure for 1 hour, conditions from 144° C. at 2.1 kPa to 233° C. at 1.88 kPa for 1 hour, conditions from 201° C. at 556 Pa to 234° C. at 410 Pa for 1 hour, and conditions from 232° C. at 113 Pa to 240° C. at 141 Pa for 1 hour to polycondense the polycondensable components. In this way, a polyester compound 3 was yielded which was a yellow solid (at room temperature).

Synthesis Example 4

In a 1-L separable flask made of stainless steel (and equipped with a K-shaped tube, a stirrer, and a nitrogen-introducing tube) were charged 125 g of 2,5-furandicarboxylic acid and 183 g of 1,3-propanediol (manufactured by Wako Pure Chemical Industries, Ltd.; special grade). In a nitrogen atmosphere of a normal pressure, the reaction system was heated at a bath temperature of 205° C. for 6 hours to esterify the dicarboxylic acid. The system was cooled to 100° C., and then thereto was added 67.3 g of sodium dimethyl 5-sulfoisophthalate. The system was further cooled to 75° C., and then thereto was added 0.364 g of titanium tetraisopropoxide. The system was raised in temperature, and then heated under a condition of 235° C. at a normal pressure for 1 hour, conditions from 190° C. at 11 kPa to 208° C. at 3 kPa for 0.5 hour, conditions from 235° C. at 74 Pa to 234° C. at 26 Pa for 1 hour, and a condition of 245° C. at 30 Pa for 1.5 hours to polycondense the polycondensable components. In this way, a polyester compound 4 was yielded which was a yellow solid (at room temperature).

Synthesis Example 5

In a 2-L separable flask made of stainless steel (and equipped with a K-shaped tube, a stirrer, and a nitrogen-introducing tube) were charged 583 g of dimethyl terephthalate (manufactured by Wako Pure Chemical Industries, Ltd.; first grade), 559 g of ethylene glycol and 1.364 g of titanium tetraisopropoxide. In a nitrogen atmosphere of a normal pressure, the reaction system was heated at a bath temperature of 210° C. for 2 hours to subject the components concerned to transesterification. The system was cooled to 120° C., and then thereto was added 242 g of sodium dimethyl 5-sulfoisophthalate. The system was further raised in temperature to cause the reactive components to react with each other at 211° C. to 230° C. at a normal pressure for 2 hours. Thereafter, the system was heated under conditions from 188° C. at 25 kPa to 220° C. at 1 kPa for 1.7 hours, conditions from 220° C. at 56 Pa to 250° C. at 32 Pa for 2.2 hours, and conditions of 290° C. at 53 Pa to 295° C. at 31 Pa for 2.5 hours to polycondense the polycondensable components. In this way, a polyester compound 5 was yielded which was a yellowish white solid (at room temperature).

Synthesis Example 6

In a 1-L separable flask made of stainless steel (and equipped with a K-shaped tube, a stirrer, and a nitrogen-introducing tube) were charged 194 g of dimethyl terephthalate, 186 g of ethylene glycol and 0.455 g of titanium tetraisopropoxide. In a nitrogen atmosphere of a normal pressure, the reaction system was heated at a bath temperature of 210° C. for 2 hours to subject the components concerned to transesterification. The system was cooled to 90° C., and then thereto was added 80.7 g of sodium dimethyl 5-sulfoisophthalate. The system was then raised in temperature to cause the reactive components to react with each other at 190° C. to 210° C. at a normal pressure for 2 hours. Thereafter, the system was heated under conditions from 200° C. at 2 kPa to 240° C. at 200 Pa for 2.5 hours, and conditions from 235° C. at 270 Pa to 245° C. at 12 Pa for 2.5 hours to polycondense the polycondensable components. In this way, a polyester compound 6 was yielded which was a white solid (at room temperature).

Synthesis Example 7

Into a 0.5-L separable flask made of stainless steel (and equipped with a dewatering conduit, a stirrer and a nitrogen-introducing tube) were charged 101 g of 2,5-furandicarboxylic acid, 88.8 g of ethylene glycol, 0.095 g of tin octylate, and 0.010 g of gallic acid. In a nitrogen atmosphere of a normal pressure, a mantle heater was used to heat the flask at 200° C. for 20 hours to esterify the dicarboxylic acid. The reaction system was cooled to room temperature, and then thereto were added 19.3 g of sodium dimethyl 5-sulfoisophthalate, 9 g of ethylene glycol, 0.022 g of titanium tetraisopropoxide, and 0.002 g of gallic acid. The reaction system was raised in temperature to cause the reactive components to react with each other at 200° C. and a normal pressure for 4 hours. In the state that the temperature of 200° C. was kept, the reaction liquid was stirred while the pressure was reduced from 670 Pa to 133 Pa over 7.5 hours. In this way, the polycondensable components were polycondensed to yield a polyester compound 7 which was a blackish brown solid (at room temperature).

Synthesis Example 8

Into a 1-L separable flask made of stainless steel (and equipped with a K-shaped tube, a stirrer and a nitrogen-introducing tube) were charged 40.5 g of dimethyl 2,6-naphthalenedicarboxylate (manufactured by Tokyo Chemical Industry Co., Ltd.; first grade), 31.8 g of ethylene glycol, 16.9 g of sodium dimethyl 5-sulfoisophthalate, 14.6 mg of manganese (II) acetate tetrahydrate (manufactured by Wako Pure Chemical Industries, Ltd.; special grade), and 465 mg of sodium acetate trihydrate (manufactured by Wako Pure Chemical Industries, Ltd.; special grade). In a nitrogen atmosphere of a normal pressure, the bath temperature was raised from 209° C. to 250° C. over 1.5 hours, and at 250° C. the system was heated for 1 hour to subject the components concerned to transesterification. Thereto was added 7.3 mg of an 85% phosphoric acid solution (manufactured by Sigma-Aldrich Co. LLC: special grade), and the reaction liquid was stirred for 10 minutes. Thereto was then added 13.1 mg of antimony trioxide (manufactured by Wako Pure Chemical Industries, Ltd.; 99.9%), and then a mantle heater was used to raise the external temperature from 270° C. to 300° C. over 2 hours. Simultaneously with the temperature-raise, the reaction liquid was stirred while the pressure in the flask was reduced from 3.3 kPa to 30 Pa. In this way, the polycondensable components were polycondensed to yield a polyester compound 8 which was a faintly-brownish white solid (at room temperature).

Synthesis Example 9

Into a 1-L separable flask made of stainless steel (and equipped with a K-shaped tube, a stirrer and a nitrogen-introducing tube) were charged 48.8 g of dimethyl 2,6-naphthalenedicarboxylate, 43.4 g of ethylene glycol, 30.2 g of sodium dimethyl 5-sulfoisophthalate, 20.4 mg of titanium tetrabutoxide (manufactured by Tokyo Chemical Industry Co., Ltd.; first grade), and 502 mg of sodium acetate. In a nitrogen atmosphere of a normal pressure, the bath temperature was raised from 190° C. to 250° C. over 2.5 hours, and at 250° C. the reaction system was heated for 0.5 hour to subject the components concerned to transesterification. Thereto was added 7.6 mg of an 85% phosphoric acid solution, and the reaction liquid was stirred for 10 minutes. A mantle heater was then used to raise the external temperature from 250° C. to 330° C. over 1.5 hours. Simultaneously with the temperature-raise, the reaction liquid was stirred while the pressure in the flask was reduced from 2.5 kPa to 30 Pa. In this way, the polycondensable components were polycondensed to yield a polyester compound 9 which was a faintly-brownish white solid (at room temperature).

Synthesis Example 10

Into a 2-L separable flask made of stainless steel (and equipped with a K-shaped tube, a stirrer and a nitrogen-introducing tube) were charged 388 g of dimethyl terephthalate, 298 g of ethylene glycol, 173 g of 1,4-cyclohexanedimethanol (cis- and trans mixture) (manufactured by Wako Pure Chemical Industries, Ltd.; first grade), and 910 mg of titanium tetraisopropoxide. In a nitrogen atmosphere of a normal pressure, the bath temperature was raised from 190° C. to 200° C. over 2.5 hours, and at 200° C. the reaction system was heated for 0.5 hour to subject the components concerned to transesterification. Thereto was added 253 g of sodium dimethyl 5-sulfoisophthalate. The bath temperature was raised from 200° C. to 230° C. over 2 hours, and at 230° C. the system was heated for 0.5 hour to subject the components concerned to transesterification. A mantle heater was then used to raise the external temperature from 190° C. to 290° C. over 5 hours. Simultaneously with the temperature-raise, the reaction liquid was stirred while the pressure in the flask was reduced from 2.4 kPa to 20 Pa. In this way, the polycondensable components were polycondensed to yield a polyester compound 10 which was a faintly-brownish white solid (at room temperature).

Synthesis Example 11

Into a 1-L separable flask made of stainless steel (and equipped with a K-shaped tube, a stirrer and a nitrogen-introducing tube) were charged 65.6 g of dimethyl terephthalate, 68.4 g of dimethyl 2,6-naphthalenedicarboxylate, 76.5 g of sodium dimethyl 5-sulfoisophthalate, 84.8 g of ethylene glycol, 59.9 g of 1,4-cyclohexanedimethanol (cis- and trans mixture) (manufactured by Wako Pure Chemical Industries, Ltd.; first grade), 41.2 mg of manganese (II) acetate tetrahydrate, 2.11 g of sodium acetate trihydrate, and 12.2 mg of cobalt (II) acetate tetrahydrate (Wako Pure Chemical Industries, Ltd.: special grade). In a nitrogen atmosphere of a normal pressure, the bath temperature was raised from 190° C. to 240° C. over 4 hours, and at 240° C. the system was heated for 1 hour to subject the components concerned to transesterification. Thereto were further added 20.6 mg of manganese (II) acetate tetrahydrate, and 15.2 g of ethylene glycol. Over 1 hour, the bath temperature was raised from 240° C. to 250° C. to subject the components concerned to transesterification. Thereto was added 38.2 mg of an 85% phosphoric acid solution, and the reaction liquid was stirred for 15 minutes. Thereafter, a mantle heater was then used to raise the external temperature from 250° C. to 330° C. over 1.5 hours. Simultaneously with the temperature-raise, the reaction liquid was stirred while the pressure in the flask was reduced from 2.5 kPa to 30 Pa. In this way, the polycondensable components were polycondensed to yield a polyester compound 11 which was a faintly-brownish white solid (at room temperature).

Synthesis Example 12

Into a 2-L separable flask made of stainless steel (and equipped with a K-shaped tube, a stirrer and a nitrogen-introducing tube) were charged 234.1 g of dimethyl terephthalate, 164.4 g of sodium dimethyl 5-sulfoisophthalate, 186.2 g of ethylene glycol, 131.5 g of Isosorbide (manufactured by Tokyo Chemical Industry Co., Ltd.; first grade), 88.2 mg of manganese (II) acetate tetrahydrate, 4.53 g of sodium acetate trihydrate, and 26.2 mg of cobalt (II) acetate tetrahydrate. In a nitrogen atmosphere of a normal pressure, the bath temperature was raised from 190° C. to 230° C. over 2 hours, and at 230° C. the system was heated for 0.5 hour to subject the components concerned to transesterification. Thereto was added 50.7 mg of an 85% phosphoric acid solution, and the reaction liquid was stirred for 15 minutes. Thereto was then added 118 mg of antimony trioxide. A mantle heater was then used to raise the external temperature from 230° C. to 310° C. over 5 hours. Simultaneously with the temperature-raise, the reaction liquid was stirred while the pressure in the flask was reduced from 4.1 kPa to 30 Pa. In this way, the polycondensable components were polycondensed to yield a polyester compound 12 which was a faintly-brownish white solid (at room temperature).

Synthesis Example 13

Into a 2-L separable flask made of stainless steel (and equipped with a K-shaped tube, a stirrer and a nitrogen-introducing tube) were charged 97.7 g of dimethyl 2,6-naphthalenedicarboxylate, 62.2 g of sodium dimethyl 5-sulfoisophthalate, 77.2 g of ethylene glycol, 23.4 g of Isosorbide, 40.8 mg of titanium tetrabutoxide, and 0.517 g of sodium acetate. In a nitrogen atmosphere of a normal pressure, a mantle heater was then used to raise the external temperature from 190° C. to 250° C. over 2 hours. At 250° C., the system was heated for 1 hour to subject the components concerned to transesterification. Thereto was added 15.2 mg of an 85% phosphoric acid solution, and the reaction liquid was stirred for 15 minutes. A mantle heater was then used to raise the external temperature from 250° C. to 340° C. over 2 hours. Simultaneously with the temperature-raise, the reaction liquid was stirred while the pressure in the flask was reduced from 3.2 kPa to 50 Pa. In this way, the polycondensable components were polycondensed to yield a polyester compound 13 which was a faintly-brownish white solid (at room temperature).

Synthesis Example 14

Into a 2-L separable flask made of stainless steel (and equipped with a K-shaped tube, a stirrer and a nitrogen-introducing tube) were charged 388 g of dimethyl terephthalate, 361 g of hydrogenated bisphenol A (manufactured by Wako Pure Chemical Industries, Ltd.; first grade), 279 g of ethylene glycol, and 910 mg of titanium tetraisopropoxide. In a nitrogen atmosphere of a normal pressure, the bath temperature was kept at a bath temperature 190° C. for 2.5 hours, and then raised to 200° C. over 0.5 hour to subject the components concerned to transesterification. Thereto was added 338 g of sodium dimethyl 5-sulfoisophthalate. The bath temperature was raised from 200° C. to 230° C. over 1 hour, and at 230° C. the system was heated for 1 hour to subject the components concerned to transesterification. The bath temperature was raised from 190° C. to 215° C. over 2 hours. Simultaneously with the temperature-raise, the pressure in the flask was reduced from 4 kPa to 455 Pa, and then a mantle heater was then used to raise the external temperature from 190° C. to 275° C. over 2.5 hours. Simultaneously with the temperature-raise, the reaction liquid was stirred while the pressure in the flask was reduced from 200 Pa to 15 Pa. In this way, the polycondensable components were polycondensed to yield a polyester compound 14 which was a faintly-brownish white solid (at room temperature).

Synthesis Example 15

Into a 1-L separable flask made of stainless steel (and equipped with a K-shaped tube, a stirrer and a nitrogen-introducing tube) were charged 60.3 g of dimethyl 2,6-naphthalenedicarboxylate, 45.4 g of ethylene glycol, 24.9 g of sodium dimethyl 5-sulfoisophthalate, 14 mg of titanium tetrabutoxide, and 104 mg of sodium acetate. In a nitrogen atmosphere of a normal pressure, a mantle heater was used to subject the components concerned to transesterification at an external temperature of 240° C. for 7 hours. Subsequently, the mantle heater was used to raise the external temperature to 280° C. Simultaneously with the temperature-raise, the reaction liquid was stirred while the pressure in the flask was reduced down to 0.9 kPa. In this way, the polycondensable components were polycondensed for 2.25 hours to yield a polyester compound 15 which was a faintly-yellow and transparent solid (at room temperature).

Synthesis Example 16 (Scaling-Up Synthesis)

Into a 30-L separable flask made of stainless steel (and equipped with a K-shaped tube, a stirrer and a nitrogen-introducing tube) were charged 2770 g of dimethyl 2,6-naphthalenedicarboxylate, 2086 g of ethylene glycol, 1144 g of sodium dimethyl 5-sulfoisophthalate, 643 mg of titanium tetrabutoxide, and 4.78 g of sodium acetate. In a nitrogen atmosphere of a normal pressure, the components concerned were subjected to transesterification at an internal temperature of 230° C. for 6.2 hours. Subsequently, the internal temperature was raised to 265° C. Simultaneously with the temperature-raise, the reaction liquid was stirred while the pressure in the flask was reduced down to 0.9 kPa (7 mmHg). In this way, the polycondensable components were polycondensed for 2 hours to yield a polyester compound 16 which was a faintly-yellow and transparent solid (at room temperature). In order to prepare compositions 2 and 3, and produce a filament, the present synthesis example was carried out times corresponding to 7 batches. The present synthesis example was performed with a good reproducibility.

Synthesis Example 17

Into a 2-L separable flask made of stainless steel (and equipped with a K-shaped tube, a stirrer and a nitrogen-introducing tube) were charged 244 g of dimethyl 2,6-naphthalenedicarboxylate, 216 g of ethylene glycol, 101 g of sodium dimethyl 5-sulfoisophthalate, 57 mg of titanium tetrabutoxide, and 211 mg of sodium acetate. In a nitrogen atmosphere of a normal pressure, a mantle heater was used to subject the components concerned to transesterification at an external temperature of 235° C. for 6.2 hours. Subsequently, the mantle heater was used to raise the external temperature to 270° C. Simultaneously with the temperature-raise, the reaction liquid was stirred while the pressure in the flask was reduced down to 4.9 kPa. In this way, the polycondensable components were polycondensed for 2 hours to yield a polyester compound 17 which was a faintly-yellow and transparent solid (at room temperature).

Synthesis Example 18

Into a 2-L separable flask made of stainless steel (and equipped with a K-shaped tube, a stirrer and a nitrogen-introducing tube) were charged 97.7 g of dimethyl 2,6-naphthalenedicarboxylate, 30 g of sodium dimethyl 5-sulfoisophthalate, 71.6 g of ethylene glycol, 81 mg of titanium tetrabutoxide, and 374 mg of sodium acetate. In a nitrogen atmosphere of a normal pressure, a mantle heater was used to raise the external temperature from 190° C. to 260° C. over 45 minutes. While this state was kept, the reaction liquid was heated and stirred for 6.5 hours to cause the components concerned to undergo transesterification reaction. The external temperature was raised from 260° C. to 290° C. over 20 minutes. Simultaneously with the temperature-raise, the pressure in the flask was reduced down from the normal pressure to 4.1 kPa. Thereafter, the external temperature was raised from 290° C. to 300° C. over 2.8 hours. Simultaneously with the temperature-raise, the reaction liquid was stirred while the pressure in the flask was reduced from 4.1 kPa to 80 Pa. In this way, the polycondensable components were polycondensed to yield a polyester compound 18 which was a yellow solid (at room temperature).

Synthesis Example 19

Into a 2-L separable flask made of stainless steel (and equipped with a K-shaped tube, a stirrer and a nitrogen-introducing tube) were charged 37.1 g of dimethyl 2,6-naphthalenedicarboxylate, 51.5 g of sodium dimethyl 5-sulfoisophthalate, 99.9 g of bisphenoxyethanol fluorene (manufactured by Tokyo Chemical Industry Co., Ltd), 32.4 g of ethylene glycol, 31 mg of titanium tetrabutoxide, and 642 mg of sodium acetate. In a nitrogen atmosphere of a normal pressure, a mantle heater was used to raise the external temperature from 200° C. to 260° C. over 2.5 hours. While this state was kept, the reaction liquid was heated and stirred for 6.5 hours to cause the components concerned to undergo transesterification reaction. The external temperature was raised from 260° C. to 290° C. over 1 hour. Simultaneously with the temperature-raise, the pressure in the flask was reduced down from the normal pressure to 5.2 kPa. Thereafter, the external temperature was raised from 290° C. to 300° C. over 1 hour. Simultaneously with the temperature-raise, the reaction liquid was stirred while the pressure in the flask was reduced from 550 Pa to 290 Pa. In this way, the polycondensable components were polycondensed to yield a polyester compound 19 which was a faintly-brownish white solid (at room temperature). The composition of diol units in the polyester compound 19 failed in being analyzed since respective component peaks of the diols overlapped with each other according to a proton NMR analysis of the polyester.

Synthesis Example 20

Into a 2-L separable flask made of stainless steel (and equipped with a K-shaped tube, a stirrer and a nitrogen-introducing tube) were charged 61.4 g of dimethyl 2,6-naphthalenedicarboxylate, 52.5 g of sodium dimethyl 5-sulfoisophthalate, 75.0 g of bisphenoxyethanol fluorene (manufactured by Tokyo Chemical Industry Co., Ltd), 50.4 g of ethylene glycol, 51 mg of titanium tetrabutoxide, and 436 mg of sodium acetate. In a nitrogen atmosphere of a normal pressure, a mantle heater was used to raise the external temperature from 190° C. to 260° C. over 1 hour 45 minutes. While this state was kept, the reaction liquid was heated and stirred for 6.5 hours to cause the components concerned to undergo transesterification reaction. The external temperature was raised from 260° C. to 290° C. over 20 minutes. Simultaneously with the temperature-raise, the pressure in the flask was reduced down from the normal pressure to 3.5 kPa. Thereafter, the external temperature was raised from 290° C. to 300° C. over 1.5 hour. Simultaneously with the temperature-raise, the reaction liquid was stirred while the pressure in the flask was reduced from 3.5 kPa to 520 Pa. In this way, the polycondensable components were polycondensed to yield a polyester compound 20 which was a yellowish white solid (at room temperature). The composition of dial units in the polyester compound 20 failed in being analyzed since respective component peaks of the diols overlapped with each other according to a proton NMR analysis of the polyester.

About each of the polyester compounds 1 to 20 yielded, respectively, in Synthesis Examples 1 to 20, the above-mentioned analyzing methods were used to gain the dicarboxylic acid composition, the diol composition, the sulfonate group amount, the weight-average molecular weight, and the glass transition temperature. The measured results are shown in Tables 1 and 2. In Tables 1 and 2, SIP (mol %) represents the proportion (mol %) of 5-sulfoisophthalate monomer units in all dicarboxylic acid monomer units in the polyester compound; FDCA (mol %), the proportion (mol %) of furandicarboxylic acid monomer units in all the dicarboxylic acid monomer units; TPA (mol %), the proportion (mol %) of terephthalic acid monomer units in all the dicarboxylic acid monomer units; NPDCA (mol %), the proportion (mol %) of 2,6-naphthalenedicarboxylic acid monomer units in all the dicarboxylic acid monomer units; EG (mol %), the proportion (mol %) of ethylene glycol monomer units in all diol monomer units in the polyester compound; DEG (mol %), the proportion (mol %) of diethylene glycol monomer units in all the diol monomer units; 1, 3PD (mol %), the proportion (mol %) of 1,3-propanediol monomer units in all the diol monomer units; DPG (mol %), the proportion (mol %) of dipropylene glycol monomer units in all the diol monomer units; CHDM (mol %), the proportion (mol %) of 1,4-cyclohexanedimethanol monomer units in all the diol monomer units; IS (mol %), the proportion (mol %) of Isosorbide monomer units in all the diol monomer units; HBPA (mol %), the proportion (mol %) of hydrogenated bisphenol A monomer units in all the diol monomer units; BPEF (mol %), the proportion (mol %) of bisphenoxyethanol fluorene in all the diol monomer units; and $SO_3$ (mmol/g), the amount (mmol/g) of the sulfonate group in the polyester.

TABLE 1

| | | | Synthesis Example 1 Compound 1 | Synthesis Example 2 Compound 2 | Synthesis Example 3 Compound 3 | Synthesis Example 4 Compound 4 | Synthesis Example 5 Compound 5 | Synthesis Example 6 Compound 6 | Synthesis Example 7 Compound 7 |
|---|---|---|---|---|---|---|---|---|---|
| Composition | Dicarboxylic Acids | SIP (mol %) | 20 | 33 | 21 | 23 | 21 | 21 | 11 |
| | | FDCA (mol %) | 80 | 67 | 79 | 77 | 0 | 0 | 89 |
| | | TPA (mol %) | 0 | 0 | 0 | 0 | 79 | 79 | 0 |
| | | NPDCA (mol%) | 0 | 0 | 0 | 0 | 0 | 0 | 0 |
| Composition | Diol | EG (mol %) | 80 | 85 | 85 | 0 | 70 | 67 | 89 |
| | | DEG (mol %) | 20 | 15 | 15 | 0 | 30 | 33 | 11 |
| | | 1,3PD (mo l%) | 0 | 0 | 0 | 85 | 0 | 0 | 0 |
| | | DPG (mol %) | 0 | 0 | 0 | 15 | 0 | 0 | 0 |
| | | CHDM (mol %) | 0 | 0 | 0 | 0 | 0 | 0 | 0 |

TABLE 1-continued

|  |  | Synthesis Example 1 Compound 1 | Synthesis Example 2 Compound 2 | Synthesis Example 3 Compound 3 | Synthesis Example 4 Compound 4 | Synthesis Example 5 Compound 5 | Synthesis Example 6 Compound 6 | Synthesis Example 7 Compound 7 |
|---|---|---|---|---|---|---|---|---|
|  | IS (mol %) | 0 | 0 | 0 | 0 | 0 | 0 | 0 |
|  | HBPA (mol %) | 0 | 0 | 0 | 0 | 0 | 0 | 0 |
|  | BPEF (mol %) | 0 | 0 | 0 | 0 | 0 | 0 | 0 |
| Physical Properties | SO₃ (mmol/g) | 0.95 | 1.48 | 0.98 | 0.97 | 0.92 | 0.90 | 0.53 |
|  | Molecular Weight Mw | 9600 | 9600 | 26000 | 29000 | 43000 | 38000 | Unmeasurable |
|  | Glass transition temperature ° C. | 96 | 120 | 101 | 63 | 71 | 69 | 79 |

TABLE 2

|  |  |  | Synthesis Example 8 Compound 8 | Synthesis Example 9 Compound 9 | Synthesis Example 10 Compound 10 | Synthesis Example 11 Compound 11 | Synthesis Example 12 Compound 12 | Synthesis Example 13 Compound 13 | Synthesis Example 14 Compound 14 |
|---|---|---|---|---|---|---|---|---|---|
| Composition | Dicarboxylic Acids | SIP (mol %) | 27 | 33 | 31 | 28 | 32 | 35 | 35 |
|  |  | FDCA (mol %) | 0 | 0 | 0 | 0 | 0 | 0 | 0 |
|  |  | TPA (mol %) | 0 | 0 | 69 | 42 | 68 | 0 | 65 |
|  |  | NPDCA (mol %) | 73 | 67 | 0 | 30 | 0 | 65 | 0 |
| Composition | Diol | EG (mol %) | 92 | 94 | 48 | 52 | 76 | 78 | 59 |
|  |  | DEG (mol %) | 8 | 6 | 14 | 7 | 3 | 10 | 23 |
|  |  | 1,3PD (mol %) | 0 | 0 | 0 | 0 | 0 | 0 | 0 |
|  |  | DPG (mol %) | 0 | 0 | 0 | 0 | 0 | 0 | 0 |
|  |  | CHDM (mol %) | 0 | 0 | 38 | 41 | 0 | 0 | 0 |
|  |  | IS (mol %) | 0 | 0 | 0 | 0 | 21 | 12 | 0 |
|  |  | HBPA (mol %) | 0 | 0 | 0 | 0 | 0 | 0 | 18 |
|  |  | BPEF (mol %) | 0 | 0 | 0 | 0 | 0 | 0 | 0 |
| Physical Properties | SO₃ (mmol/g) |  | 1.03 | 1.28 | 1.05 | 1.03 | 1.31 | 1.00 | 1.29 |
|  | Molecular Weight Mw |  | 52000 | 22000 | 36000 | 13000 | 8500 | 23000 | 3500 |
|  | Glass transition temperature ° C. |  | 118 | 128 | 92 | 108 | 106 | 140 | 141 |

|  |  |  | Synthesis Example 15 Compound 15 | Synthesis Example 16 Compound 16 | Synthesis Example 17 Compound 17 | Synthesis Example 18 Compound 18 | Synthesis Example 19 Compound 19 | Synthesis Example 20 Compound 20 |
|---|---|---|---|---|---|---|---|---|
| Composition | Dicarboxylic Acids | SIP (mol %) | 25 | 25 | 25 | 20 | 54 | 43 |
|  |  | FDCA (mol %) | 0 | 0 | 0 | 0 | 0 | 0 |
|  |  | TPA (mol %) | 0 | 0 | 0 | 0 | 0 | 0 |
|  |  | NPDCA (mol %) | 75 | 75 | 75 | 80 | 46 | 57 |
| Composition | Diol | EG (mol %) | 59 | 64 | 54 | 68 | Unmeasurable | Unmeasurable |
|  |  | DEG (mol %) | 41 | 36 | 46 | 32 | Unmeasurable | Unmeasurable |
|  |  | 1,3PD (mol %) | 0 | 0 | 0 | 0 | 0 | 0 |
|  |  | DEG (mol %) | 0 | 0 | 0 | 0 | 0 | 0 |
|  |  | CHDM (mol %) | 0 | 0 | 0 | 0 | 0 | 0 |
|  |  | IS (mol %) | 0 | 0 | 0 | 0 | 0 | 0 |
|  |  | HBPA (mol %) | 0 | 0 | 0 | 0 | 0 | 0 |
|  |  | BPEF (mol %) | 0 | 0 | 0 | 0 | Unmeasurable | Unmeasurable |
| Physical Properties | SO₃ (mmol/g) |  | 0.91 | 0.93 | 0.92 | 0.74 | Unable to Calculate | Unable to Calculate |
|  | Molecular Weight Mw |  | 15000 | 19000 | 21000 | 41000 | 11000 | 12000 |
|  | Glass transition temperature ° C. |  | 102 | 110 | 99 | 105 | 173 | 153 |

EXAMPLES AND COMPARATIVE EXAMPLES

[Performance Evaluating Methods]

[Solubility in Neutral Water]

A coffee mill (Mini Blender, manufactured by Osaka Chemical Co., Ltd.) is used to pulverize a polymer (for a pulverizing period of 120 seconds), and then 0.25 g of the resultant polymer powder is dispersed in 5 g of ion exchange water having one or each of two out of predetermined temperatures shown in Tables 3, 4 and 5. Ultrasonic waves are applied thereto for 10 minutes. A remaining undissolved fragment of the polymer is filtrated and separated by filtration under a reduced pressure (using a filtrating paper piece No. 5C/70-mm, manufactured by Advantech Co., Ltd.). The fragment is washed with a small volume of ion exchange water, and then dried. The dry weight of the remaining undissolved polymer fragment is measured, and then the dissolution rate thereof is calculated out in accordance with an equation described below. However, in the solubility test at 70° C., the amount of the polymer powder and that of ion exchange water are set to 0.5 g and 10 g, respectively, and no ultrasonic waves are applied to the sample. At the same temperature, the sample is allowed to stand still.

Dissolution rate (%)=("polymer mass before the dissolution"−"mass of the remaining undissolved polymer fragment")/"polymer mass before the dissolution"×100

[Solubility in Neutral Water Containing Water-Soluble Organic Solvent]

Instead of the ion exchange water, a 10%-by-mass solution of ethylene glycol mono-t-butyl ether (Tokyo Chemical Industry Co., Ltd) in water is used to calculate the dissolution rate of the same polymer.

[Hygroscopicity]

Approximately 2 g of the polymer powder obtained by pulverization in the same manner as described above is vacuum-dried at 80° C. for 3 hours, and then the polymer powder is precisely weighed into a petri dish. The dish is allowed to stand still in a thermostat of 25° C. temperature and 98% RH. After 24 hours, the mass of the powder is measured, and the hygroscopicity thereof is calculated out in accordance with the following equation:

Hygroscopicity (%)=("polymer mass after the still standing"−"polymer mass before the still standing")/"polymer mass before the still standing"×100

[Preparation of Composition 1]

A melt kneader (Labo Plastmill 4C150, manufactured by Toyo Seiki Kogyo Co., Ltd.) was used to melt and knead 41.7 g of the polyester compound 15 yielded in Synthesis Example 15, and 8.3 g of a product KURARITY LA4285 (thermoplastic elastomer manufactured by Kuraray Co., Ltd.=triblock copolymer of polymethyl methacrylate/polybutyl acrylate/polymethyl methacrylate) at 230° C. and 90 r/min. for 10 minutes to yield a composition 1 which was a white mixture.

[Preparation of Composition 2]

At 60° C., the following were dried under a reduced pressure: 12 kg of the polyester compound 16 yielded in Synthesis Example 16; and 2.4 kg of a product KURARITY LA2250 (thermoplastic elastomer manufactured by Kuraray Co., Ltd.=triblock copolymer of polymethyl methacrylate/polybutyl acrylate/polymethylmethacrylate). A Henschel mixer was then used to mix these components preliminarily with each other. Thereafter, a biaxial kneader (PCM-30, manufactured by Ikegai Corp.; screw diameter=29 mm, and L/D=36.5) was used to melt and kneader the mixture at a cylinder temperature of 180° C., a cylinder rotation number of 200 rpm, and a kneaded-product-discharging speed of 3 kg/h to yield a composition 2 which was a white mixture.

[Preparation of Composition 3]

At 60° C., the following were dried under a reduced pressure: 12 kg of the polyester compound 16 yielded in Synthesis Example 16; 2.4 kg of the product KURARITY LA2250 (thermoplastic elastomer manufactured by Kuraray Co., Ltd.=triblock copolymer of polymethyl methacrylate/polybutyl acrylate/polymethyl methacrylate); and 0.6 kg of a compatibilizer BONDFAST 7B (copolymer manufactured by Sumitomo Chemical Co., Ltd., and made from ethylene/vinyl acetate/glycidyl methacrylate). A Henschel mixer was then used to mix these components preliminarily with each other. Thereafter, the same biaxial kneader as used in the preparation of the composition 2 was used to melt and kneader the mixture at a cylinder temperature of 190° C., a cylinder rotation number of 300 rpm, and a kneaded-product-discharging speed of 3 kg/h to yield a composition 3 which was a white mixture.

[Preparation of Drawn Filament 1]

In order to produce a drawn filament of the composition 2, a monofilament producing apparatus (monofilament producing apparatus, manufactured by Chubu Machine Co., Ltd.) was used, which is equipped with an extruder, a cooling water tank, a winding device, and a hot wind tank. The composition 2 was charged into a hopper of the extruder (gear pump=1.2 cc/rotation, screw diameter=30 mm, and L/D=28), which is 5 mm in nozzle diameter, and then extruded at a cylinder temperature of 195° C. and a rotation number of 36 rpm. The extruded composition was cooled with water, and then the resultant filament was wound onto a roll at a rate of 10.0 m/min. The filament was further heated (filament temperature actually measured value: 100° C.) with hot wind of 200° C. temperature, and wound onto a roll at a rate of 18.0 m/min. While wound in this way, the filament was drawn (total draw ratio: 8.7 to 11). As a result, a filament of about 1.5 to 1.7=diameter was yielded. It was understood that the drawn filament having this composition 2 was clearly higher in toughness than a filament having the same composition and a low draw ratio (1.8) and produced through a Capilograph in the same manner as in Example 16.

[Preparation of Drawn Filament 2]

In order to produce a drawn filament of the composition 3, a monofilament producing apparatus (monofilament producing apparatus, manufactured by Chubu Machine Co., Ltd.) was used, which is equipped with an extruder, a cooling water tank, a winding device, and a hot wind tank. The composition 3 was charged into a hopper of the extruder (gear pump=1.2 cc/rotation, screw diameter=30 mm, and L/D=28), which is 5 mm in nozzle diameter, and then extruded at a cylinder temperature of 210° C. and a rotation number of 37 rpm. The extruded composition was cooled with water, and then the resultant filament was wound onto a roll at a rate of 8.0 m/min. The filament was further heated (filament temperature actually measured value: 100° C.) with hot wind of 195° C. temperature, and wound onto a roll at a rate of 20.5 m/min. While wound in this way, the filament was drawn (total draw ratio: 8.7 to 9.8). As a result, a filament of about 1.6 to 1.7=diameter was yielded. It was understood that the drawn filament having this composition 3 was clearly higher in toughness than the filament having the same composition and the low draw ratio (1.8) and produced through the Capilograph in the same manner as in Example 16.

Examples 1 to 23, and Comparative Examples 1 to 4

About each of the polyester compounds 1 to 17 yielded in some of the above-mentioned synthesis examples, the compositions 1 to 3, and commercially available support materials 1 and 2 described below, the solubility thereof in neutral water and the hygroscopicity thereof were evaluated by the above-mentioned methods. The results are shown in Tables 3 and 4. Moreover, about each of the polyester compounds 18 to 20 yielded in some of the synthesis examples, and the commercially available support materials 1 and 2 described below, the solubility thereof in neutral water containing a water-soluble organic solvent and the hygroscopicity thereof were evaluated by the above-mentioned methods. The results are shown in Table 5. In Tables 3, 4 and 5, the commercially available products 1 and 2 are as follows:

Commercially available product 1: natural PVA/1.75-mm polyvinyl alcohol (manufactured by Kenbill Co., Ltd.; number-average molecular weight: 30000, and glass transition temperature: 80° C.)

Commercially available product 2: soluble support material P400S (registered trade name), which is a copolymer made from methacrylic acid and methyl methacrylate (55/45% by mass) (manufactured by Stratasys Ltd.; the composition thereof was analyzed by NMR (DMSO-d6); weight-average molecular weight: 130000, and glass transition temperature: 100° C.; plasticizer: triphenyl phosphate and others were contained.

TABLE 3

| Sample | Example 1 Compound 1 | Example 2 Compound 2 | Example 3 Compound 3 | Example 4 Compound 4 | Example 5 Compound 5 | Example 6 Compound 6 | Example 7 Compound 7 | Comparative Example 1 Commercially Available Product 1 | Comparative Example 2 Commercially Available Product 2 |
|---|---|---|---|---|---|---|---|---|---|
| Dissolution Rate % 25° C. | 12 | 98 | 32 | 97 | 7 | 98 | 8 | 87 | 3 |
| Dissolution Rate % 40° C. | 94 | 99 | 78 | 98 | 54 | 98 | 20 | 98 | 8 |
| Hygroscopicity % | 3 | 17 | 5 | 5 | 5 | 5 | 5 | 31 | 4 |

TABLE 4

| Sample | Example 8 Compound 8 | Example 9 Compound 9 | Example 10 Compound 10 | Example 11 Compound 11 | Example 12 Compound 12 | Example 13 Compound 13 | Example 14 Compound 14 | Example 15 Composition 1 |
|---|---|---|---|---|---|---|---|---|
| Dissolution Rate % 40° C. | 18 | 16 | 26 | 37 | 99 | 10 | 100 | 39 |
| Dissolution Rate % 70° C. | 35 | 49 | 79 | 100 | 99 | 44 | 99 | 72 |
| Hygroscopicity % | 7 | 10 | 7 | 5 | 13 | 10 | 16 | 7 |

| Sample | Example 16 Composition 2 | Example 17 Composition 3 | Example 18 Compound 15 | Example 19 Compound 16 | Example 20 Compound 17 | Comparative Example 1 Commercially Available Product 1 | Comparative Example 2 Commercially Available Product 2 |
|---|---|---|---|---|---|---|---|
| Dissolution Rate % 40° C. | 13 | 13 | 95 | 28 | 34 | 98 | 8 |
| Dissolution Rate % 70° C. | 68 | 61 | 98 | 98 | 99 | 99 | 4 |
| Hygroscopicity % | 1 | 1 | 8 | 5 | 6 | 31 | 4 |

TABLE 5

| Sample | Example 21 Compound 18 | Example 22 Compound 19 | Example 23 Compound 20 | Comparative Example 3 Commercially Available Product 1 | Comparative Example 4 Commercially Available Product 2 |
|---|---|---|---|---|---|
| Dissolution Rate % 70° C. | 28 | 92 | 67 | 98 | 0 |
| Hygroscopicity % | 3 | 6 | 6 | 31 | 4 |

Example 24

A Capilograph (Capilograph 1D, manufactured by Toyo Seiki Kogyo Co., Ltd.) was used to extrude the polyester compound 6 from its capillary of 2 mm diameter and 10 mm length at a melting temperature of 180° C. and an extruding rate of 10 mm/min. While a tip of the extruded product was sandwiched between tweezers and then lightly pulled by hand, the product was worked into a filament of 1.5 mm diameter. Thereafter, the filament was supplied to an Atom 3D printer manufactured by a company Genkei and extruded from its heat nozzle having a temperature of 230° C. As a result, the printer nozzle succeeded in jetting out the filament without being blocked. It was verified that the melted product was also immediately solidified.

The invention claimed is:

1. A soluble material for three-dimensional modeling, which is used as a raw material of a support material for supporting a three-dimensional object when the three-dimensional object is produced, using a 3D printer of a fused deposition modeling system;
    the soluble material comprising a polyester resin comprising one or more aromatic dicarboxylic acid monomer units A with a sulfonate group, one or more dicarboxylic acid monomer units B without a sulfonate group, and one or more diol monomer units; and the proportion of the aromatic dicarboxylic acid monomer unit(s) A in the total of all dicarboxylic acid monomer units being from 10 to 70 mol %, wherein said polyester resin has a weight average molecular weight in the range 11,000 to 38,000, and wherein the content of the sulfonate groups in the polyester resin is in the range 0.5 to 3 mmol/g.

2. The soluble material for three-dimensional modeling according to claim 1, wherein an aromatic dicarboxylic acid A from which the aromatic dicarboxylic acid monomer unit(s) A is/are derived is selected from the group consisting of 5-sulfoisophthalic acid, and 2-sulfoterephthalic acid.

3. The soluble material for three-dimensional modeling according to claim 1, wherein a counter ion of a sulfonic acid group constituting the sulfonate group is at least one selected from the group consisting of a sodium ion, a potassium ion, a magnesium ion, and an ammonium ion.

4. The soluble material for three-dimensional modeling according to claim 1, wherein a dicarboxylic acid B from which the dicarboxylic acid monomer unit(s) B is/are derived is at least one selected from the group consisting of aromatic dicarboxylic acids and alicyclic dicarboxylic acids.

5. The soluble material for three-dimensional modeling according to claim 1, wherein a diol C from which the diol monomer unit(s) is/are derived has 2 to 31 carbon atoms.

6. The soluble material for three-dimensional modeling according to claim 1, wherein the diol monomer unit(s) is/comprise one or more diethylene glycol units, and the proportion of the diethylene glycol unit(s) in the total of all diol monomer units in the polyester resin is from 5 to 60 mol % both inclusive.

7. The soluble material for three-dimensional modeling according to claim 1, which is in the form of a filament.

8. The soluble material for three-dimensional modeling according to claim 7, wherein the filament has a diameter of 0.5 to 3.0 mm.

9. The soluble material for three-dimensional modeling according to claim 7, which is a drawn soluble material for three-dimensional modeling.

10. The soluble material for three-dimensional modeling according to claim 1, wherein a dicarboxylic acid B for deriving the dicarboxylic acid monomer unit B is at least one dicarboxylic acid selected from the group consisting of an aromatic dicarboxylic acid and an alicyclic dicarboxylic acid.

11. The soluble material for three-dimensional modeling according to claim 1, wherein the rate of the total amount of the aromatic dicarboxylic acid monomer unit A and the dicarboxylic acid monomer unit B in the total amount of all dicarboxylic acid monomer units in the polyester resin is 80 mol % or more.

12. The soluble material for three-dimensional modeling according to claim 1, wherein a diol C for deriving the diol monomer unit is at least one diol selected from the group consisting of an aliphatic diol and an aromatic diol.

13. The soluble material for three-dimensional modeling according to claim 12, wherein the diol C includes diethylene glycol, wherein the proportion of units of diethylene glycol in the total of all diol monomer units in the polyester resin is 5 mol % or more and 60 mol % or less.

14. The soluble material for three-dimensional modeling according to claim 1, wherein the polyester resin is a polyester resin $\alpha$ in which the proportion of the aromatic dicarboxylic acid monomer units A in the total of all dicarboxylic acid monomer units, which include the aromatic dicarboxylic acid units A, is from 15 to 40 mol %; the proportion of the dicarboxylic acid monomer units B in the same total is from 60 to 85 mol %; and a dicarboxylic acid B for yielding the dicarboxylic acid monomer units B is 2,5-furandicarboxylic acid.

15. The soluble material for three-dimensional modeling according to claim 14, wherein the proportion of the aromatic dicarboxylic acid monomer units A in the total of all the dicarboxylic acid monomer units in the polyester resin $\alpha$, which include the aromatic dicarboxylic acid monomer units A, is 15 mol % or more and 40 mol % or less.

16. The soluble material for three-dimensional modeling according to claim 14, wherein the proportion of the aromatic dicarboxylic acid monomer units B in the total of all the dicarboxylic acid monomer units in the polyester resin $\alpha$, which include the aromatic dicarboxylic acid monomer units A, is 60 mol % or more and 85 mol % or less.

17. The soluble material for three-dimensional modeling according to claim 14, wherein the aromatic dicarboxylic acid A in the polyester resin $\alpha$ is at least one selected from the group consisting of 5-sulfoisophthalic acid and 2-sulfoisophthalic acid.

18. The soluble material for three-dimensional modeling according to claim 14, wherein a diol C in the polyester resin $\alpha$ from which the diol monomer unit(s) is/are derived is at least one selected from the group consisting of ethylene glycol, diethylene glycol, 1,3-propane diol, and dipropylene glycol.

19. The soluble material for three-dimensional modeling according to claim 1, wherein the content of the polyester resin in the soluble material for three-dimensional modeling is 30% by mass or more.

* * * * *